(12) United States Patent
Bogusz et al.

(10) Patent No.: US 10,593,305 B2
(45) Date of Patent: Mar. 17, 2020

(54) PREFETCHING PAGE ACCESS DATA FOR INPUT SURFACES REQUIRING PROCESSING

(71) Applicant: ARM Limited, Cambridge (GB)

(72) Inventors: Michal Karol Bogusz, Cambridge (GB); Damian Piotr Modrzyk, Katowice (PL); Quinn Carter, Ontario (CA); Thomas James Cooksey, Fulbourn (GB)

(73) Assignee: Arm Limited, Cambridge (GB)

( * ) Notice: Subject to any disclaimer, the term of this patent is extended or adjusted under 35 U.S.C. 154(b) by 201 days.

(21) Appl. No.: 15/361,751

(22) Filed: Nov. 28, 2016

(65) Prior Publication Data

US 2017/0162179 A1 Jun. 8, 2017

(30) Foreign Application Priority Data

Dec. 8, 2015 (GB) .................................. 1521597.3

(51) Int. Cl.
*G06F 12/0862* (2016.01)
*G06F 12/0875* (2016.01)
(Continued)

(52) U.S. Cl.
CPC ......... *G09G 5/397* (2013.01); *G06F 12/0862* (2013.01); *G06F 12/0875* (2013.01);
(Continued)

(58) Field of Classification Search
None
See application file for complete search history.

(56) References Cited

U.S. PATENT DOCUMENTS 6,538,650 B1  3/2003 Prasoonkumar
6,628,294 B1  9/2003 Sadowsky
(Continued)

FOREIGN PATENT DOCUMENTS

EP       1988467 A1    11/2008
GB       2466981 A      7/2010
WO   WO 2012/119148 A1  9/2012

OTHER PUBLICATIONS

Combined Search and Examination Report, dated May 25, 2016, GB Patent Application No. GB15215973.

*Primary Examiner* — Charles Rones
*Assistant Examiner* — Hewy H Li
(74) *Attorney, Agent, or Firm* — Vierra Magen Marcus LLP

(57) ABSTRACT

A display controller for a data processing system includes a memory read sub-system operable to read data of input surfaces to be used as input layers to be processed by the display controller.
The memory read sub-system is operable to request in advance the loading of memory address translation data into a memory address translation data cache for memory pages storing data relating to an input surface. The memory read sub-system selects the memory pages that it requests the advance loading of address translation data for based on information relating to the data for the input surface that will be required by the display controller to generate the output surface, such as the vertical and horizontal size of the input layer that the input surface will be used for, an indication of any flipping or rotation of the input surface, etc.

18 Claims, 11 Drawing Sheets

(51) Int. Cl.
  *G06F 12/1027* (2016.01)
  *G06T 1/60* (2006.01)
  *G09G 5/397* (2006.01)
  *G09G 5/36* (2006.01)
  *G09G 5/395* (2006.01)
  *G06T 15/00* (2011.01)

(52) U.S. Cl.
  CPC ......... *G06F 12/1027* (2013.01); *G09G 5/363* (2013.01); *G09G 5/395* (2013.01); *G06F 2212/1016* (2013.01); *G06F 2212/302* (2013.01); *G06F 2212/455* (2013.01); *G06F 2212/602* (2013.01); *G06F 2212/6022* (2013.01); *G06T 1/60* (2013.01); *G06T 15/005* (2013.01); *G09G 2360/121* (2013.01); *G09G 2360/18* (2013.01)

(56) References Cited

U.S. PATENT DOCUMENTS

| | | | | |
|---|---|---|---|---|
| 6,854,046 B1* | 2/2005 | Evans | ............... | G06F 12/1036 711/203 |
| 8,405,668 B2* | 3/2013 | Bratt | ............... | G06F 12/1027 345/564 |
| 8,767,005 B2* | 7/2014 | Holland | ............... | G09G 5/026 345/506 |
| 8,797,359 B2* | 8/2014 | Tripathi | ............... | G06T 3/606 345/560 |
| 2011/0267354 A1* | 11/2011 | Ishibashi | ............... | G06T 1/20 345/441 |
| 2012/0131306 A1* | 5/2012 | Bratt | ............... | G06F 12/1027 711/205 |

\* cited by examiner

PREFETCHING PAGE ACCESS DATA FOR INPUT SURFACES REQUIRING PROCESSING

BACKGROUND

The technology described herein relates to data processing systems and in particular to display controllers for data processing systems.

FIG. 1 shows an exemplary data processing system that comprises a central processing unit (CPU) 7, a graphics processing unit (GPU) 2, a video codec 1, a display controller 5, and a memory controller 8. As shown in FIG. 1, these units communicate via an interconnect 9 and have access to off-chip memory 3. In use of this system the GPU 2, video codec 1 and/or CPU 7 will generate surfaces (images) to be displayed and store them, via the memory controller 8, in respective frame buffers in the off-chip memory 3. The display controller 5 will then read those surfaces as input layers from the frame buffers in the off-chip memory 3 via the memory controller 8, process the input surfaces appropriately and send them to a display 4 for display.

FIG. 2 shows an exemplary data path for the processing of the input surfaces for display in the display controller 5. It is assumed in this example that the display controller 5 can take as inputs for a given output surface to be displayed a plurality of input surfaces (layers), and includes, inter alia, a composition engine (stage) 22 that is able to compose one or more input surfaces (layers) (e.g. generated by the GPU 2 and/or video codec 1) to provide a composited output frame for display.

As shown in FIG. 2, the display controller includes a DMA (Direct Memory Access) read unit 20 that reads data of input surfaces to be displayed and provides it appropriately to respective sets of latency "hiding" FIFOs 21. (The latency hiding FIFOs 21 provide "latency" buffering in the display processing path to allow for potential latency in retrieving the required input surface data from memory. There is one set of latency FIFOs 21 for each "layer" that the display controller can take as an input for its processing.)

The input surfaces that the display controller 5 processes to provide the output surface for display will be generated, as discussed above, e.g. by the video codec 1, CPU 7 and/or GPU 2 of the overall data processing system, and stored as respective frame buffers in the main memory 3 of the data processing system.

Each input surface will occupy a certain amount of physical memory of the main memory 3 and will need to be read from that physical memory when it is to be processed by the display controller 5.

In order to access data stored in memory, many data processing systems use so-called "virtual" memory addressing arrangements, in which the address used in a given memory access request is translated from a virtual memory address used by the memory access initiator (the unit requesting the memory access) to a corresponding physical memory address used by the memory system. To perform the translation between the (virtual) address used for a memory access request and the corresponding physical memory address where the data is actually stored, a set of address translation data that maps virtual addresses used in memory accesses to corresponding physical memory addresses is usually stored.

This process is typically performed in a so-called memory management unit of the data processing system. The memory management unit operates to allocate physical memory for data storage in given units of memory size, typically referred to as "memory pages" or "pages", and associates corresponding virtual memory addresses (pages) with the physical memory addresses (pages) where the data is actually stored. Accordingly, the address translation data which maps virtual addresses used in memory accesses to corresponding physical memory addresses typically maps virtual memory page addresses to corresponding physical memory page addresses. Thus the memory address translation data is typically in the form of so-called page tables. There can be multiple levels of page tables (which, with the exception of the base page table, are typically also stored in virtual memory).

The memory management unit pages are typically allocated at a predefined granularity (size) in order to allow for memory allocations of different sizes to be created and released by the memory management unit. Each input surface will, typically, occupy plural memory pages. The memory page allocation for an input surface will frequently correspond to physical pages occupying non-contiguous address ranges in memory.

The full set of memory management address translation data (the full MMU page table) is typically stored in main memory, and indicates which physical memory address range corresponds to a given virtual memory address range that may be used by a memory access initiator.

However, to facilitate more rapid accessing of the memory access address translation data, memory systems and memory management units typically include a cache memory, often referred to as a translation lookaside buffer (TLB), in which a small amount of address translation data (page table entries) is stored, so as to allow faster access to that address translation data and to thereby speed up the address translation and checking process. (If the required address translation data is not stored in the cache (TLB), then that data must be fetched from the main address translation data (page tables) in main memory, which can take a more significant period of time.)

When a frame is to be displayed, the input surfaces that form the input layers are composed in the display composition stage 22 to provide a composited output surface for display. The composited output surface (i.e. the frame that is to be displayed) is then subject to display timing control 23 (e.g. the inclusion of appropriate horizontal and vertical blanking periods), and then provided to the display output interface of the display controller 5 for provision to the display 4 for display.

This process is repeated for each frame that needs to be displayed, e.g. at a rate of 30 or 60 frames per second.

As such display processing is a real-time operation, the display controller 5 needs to deliver the pixel data to be displayed to the display 4 (to the display output) regularly, in each clock cycle triggering the display output from the display controller. If valid pixel data is not available when the display output is triggered, then so-called "under-run" occurs, i.e. there is insufficient data for sending to the display. In this case, some default, "error" operation is usually performed, such as simply displaying a default arbitrary colour for those pixels for which "real" pixel data is not available.

Such "under-run" can occur, for example, because of latencies in fetching the input surface data from memory, such that the required data has not been fetched and/or has not completed its processing, by the time it is required to be displayed.

The Applicants believe that there remains scope for improvements to the operation of display controllers when providing frames for display.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
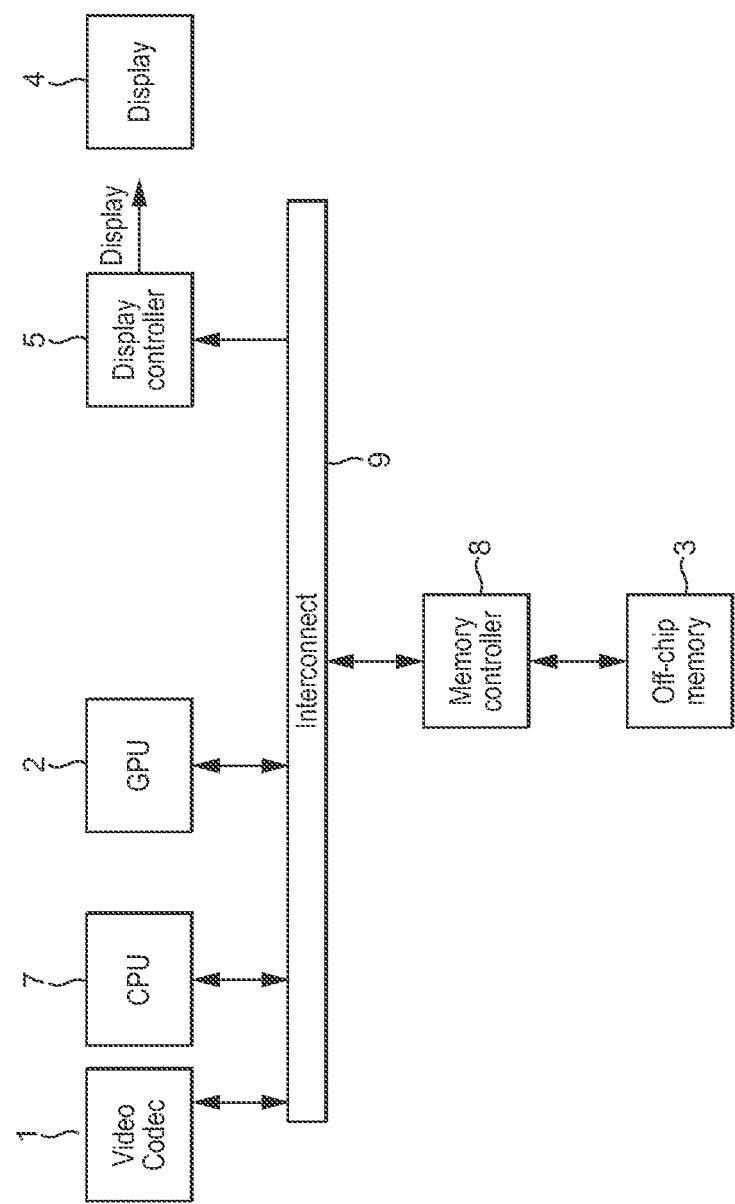
FIG. 1 shows an exemplary data processing system.
Figure 2:
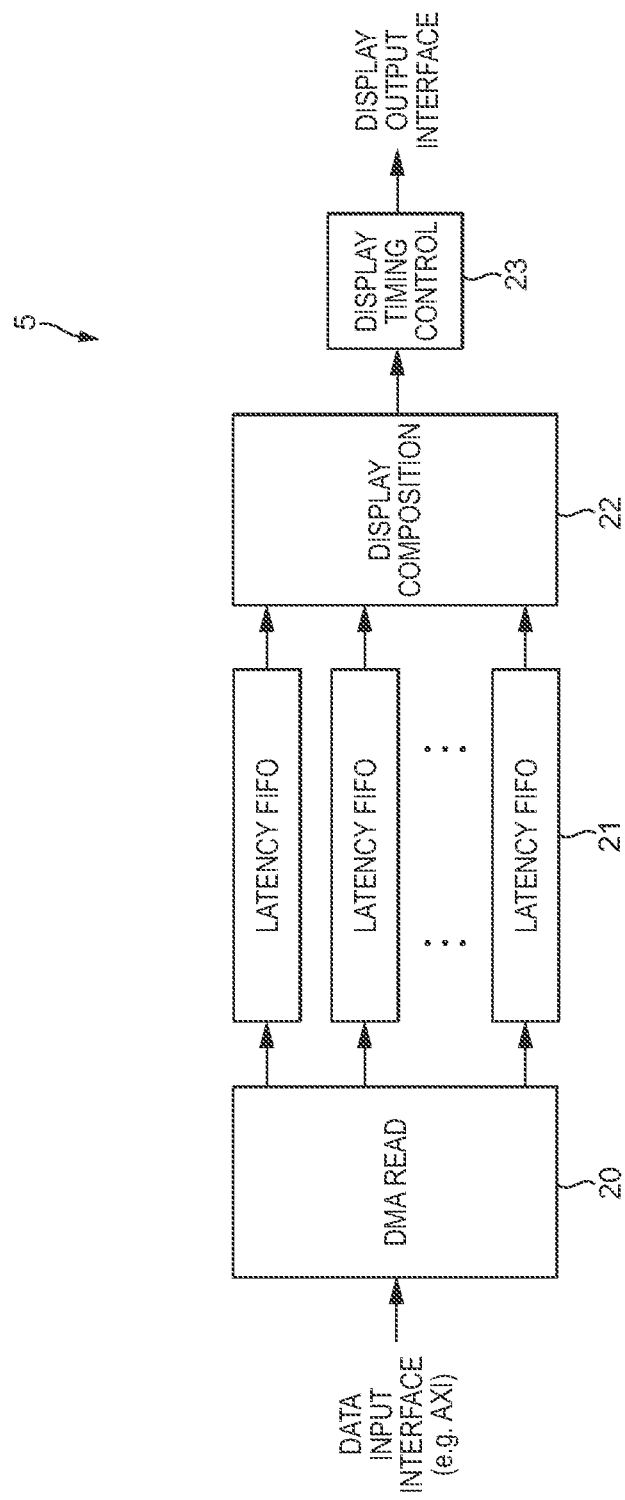
FIG. 2 shows schematically the data-flow in a display controller.

A first embodiment of the technology described herein comprises a display controller for a data processing system, the display controller comprising:

a memory read sub-system operable to read data of input surfaces to be processed by the display controller;

a processing stage operable to process one or more read input surfaces to generate an output surface; and an output stage operable to provide an output surface for display to a display;

wherein:

the memory read sub-system is operable to request in advance the loading of memory page access data for memory pages storing data relating to an input surface to be read and processed by the display controller to generate an output surface into a memory page access data cache, the memory read sub-system being operable to select the memory pages that it requests the advance loading of memory page access data for based on information relating to the data for the input surface that will be required by the processing stage to generate the output surface.

A second embodiment of the technology described herein comprises a method of operating a display controller for a data processing system, the display controller comprising:

a memory read sub-system operable to read data of input surfaces to be processed by the display controller;

a processing stage operable to process one or more read input surfaces to generate an output surface; and an output stage operable to provide an output surface for display to a display;

the method comprising, when the display controller is to generate an output surface for display from one or more input surfaces:

the memory read sub-system:

using information relating to the data for the input surface or surfaces that will be required by the processing stage to generate the output surface to determine one or more memory pages storing data relating to the input surface or surfaces that will be used by the processing stage to generate the output surface; and requesting the loading of memory page access data for the determined memory pages storing data relating to an input surface to be read and processed by the display controller to generate an output surface into a memory page access data cache in advance of a request for the data of the input surface that is stored in the memory pages in question.

The technology described herein relates to display controllers and display controller operation in data processing systems which use virtual memory addressing arrangements and so require address translation data to identify the relevant physical memory address where data of an input surface is stored from a virtual address used for that data.

The display controller of the technology described herein includes a memory read subsystem that is operable to load memory page access data (such as address translation data) for memory pages containing data for input surfaces that will be required by the display controller into a cache that stores the memory page access (e.g. address translation) data for use when fetching data from memory. Using a cache to store the memory page access (e.g. address translation) data for the memory pages for the input surfaces facilitates more efficient and quicker fetching of the actual input surface data when it is required, e.g. for processing as an input layer by the display controller.

The memory read subsystem of the display controller of the technology described herein is in an embodiment operable to request in advance the loading into the cache of memory page access (e.g. address translation) data for memory pages containing data for input surfaces that will be required by the display controller (to "pre-fetch" that memory page access data into the cache).

Furthermore, the memory read subsystem selects the memory pages whose access (e.g. address translation) data it requests to be loaded into the cache in advance (that it pre-fetches) based on information relating to the data for the input surface or surfaces that the display controller will require when processing those surfaces (in contrast to, for example, simply loading the access, e.g. address translation, data for all the memory pages storing data for an input surface into the cache in advance).

Thus, in the technology described herein, the memory read subsystem loads into the cache in advance memory page access (e.g. address translation) data for memory pages containing input surface data that it knows or expects that the display controller will require. As will be discussed further below, this then facilitates more efficient and effective loading of the memory page access data into a cache (TLB) for that data, such as loading address translation data into an address translation data cache (TLB).

For example, and as will be discussed in more detail below, the memory read subsystem of the technology described herein can be used to ensure that only the address translation data for frame buffer pages that contain data that is going to be used to display a surface is loaded in advance (i.e. to avoid loading address translation data for pages in the frame buffer for the input surface that contain data that is not actually going to be used when displaying the input surface). This can accordingly reduce memory traffic, bandwidth and power consumption in the memory system, as compared, for example, to arrangements in which all of the address translation data for an input surface is pre-fetched into the cache, irrespective of whether that data is actually required or not.

Additionally or alternatively, and again as will be discussed further below, the memory read subsystem of the technology described herein can request the loading into the cache in advance of the memory page access data (e.g. address translation data) for memory pages containing data relating to an input surface to be displayed in the order that the input surface data will be required for processing for display. This then facilitates, as will be discussed further below, keeping only a more limited number of memory page access data (e.g. address translation data) entries in the memory page access data cache at the same time, and, accordingly, can allow a (potentially significant) reduction in the size of the cache required to store the memory page access, e.g. address translation, data (whilst still facilitating more efficient and quicker access to the input surface data in memory when that input surface data is needed).

This can all accordingly allow the memory system working with the display controller to have reduced caches (and thus area), and, correspondingly, reduce the power consumption in the memory system.

The memory page access data cache that the memory page access data is loaded into can be any suitable and desired cache (local memory) of the data processing system for that data. It is in an embodiment a cache of or associated with a memory management unit of or the memory management unit of the memory system of the data processing system that the display controller is part of, such as, and in an embodiment, a translation lookaside buffer (TLB) of or associated with a memory management unit (MMU) of the data processing system. As will be discussed further below, the memory page access data cache may be part of the display controller itself (where the display controller includes a memory management unit), or it may be a cache (e.g. TLB) that is located elsewhere in the data processing system that the display controller is part of.

The memory page access data that is loaded into the memory page access data cache can comprise any suitable and desired form of memory page data that facilitates and/or relates to accessing and/or access to the actual data that is stored in the memory page in question.

In an embodiment, the memory page access data comprises memory address translation data.

In this case, the memory address translation data can comprise any suitable and desired form of memory address translation data (i.e. that can allow the translation of a virtual memory address used to request data from memory to the corresponding physical address in memory of that data (that maps a virtual memory address to a corresponding physical memory address)). It in an embodiment allows a virtual memory page address to be translated to the corresponding physical memory page address. In an embodiment, the memory address translation data comprises the page table entry for the memory page in question.

In another embodiment, the memory page access data comprises memory page protection data, and in an embodiment data indicating permissions relating to access to the (data in the) memory page in question, such as, and in an embodiment, read/write access rights (permissions) of (associated with) (for) the memory page. The Applicants have recognised in this regard that it may be desirable to be able to also or instead pre-fetch such memory page protection (access permission) data in the manner of the technology described herein, e.g. in systems that store and use indications of what data "requestors" have permission to access data in a given memory page. In this case, the memory protection data (access permissions) may be stored in a memory page protection data table(s), but may use a different set of page tables to any memory address translation data, so that the protection data can, e.g., be managed by another system entity.

In one embodiment, the memory page access data that is pre-fetched comprises both memory address translation data and memory protection data for the memory page or memory pages in question. Where both memory address translation data and memory protection data for a memory page may be pre-fetched, then there could be a single memory page access data cache that all that data is pre-fetched into, or there could be a separate cache for each type of data (i.e. a cache for the memory address translation data and a separate cache for the memory protection data).

The memory page access data that is loaded into the cache for that data may be "complete" (i.e. comprise all the relevant data for the memory page in question), or it may be "incomplete" (i.e. comprise only some but not all of the relevant data for the memory page in question).

For example, where the memory page access data that is loaded into the memory page access data cache comprises memory address translation data, then the memory address translation data that is loaded into the memory page data cache may comprise the full memory address translation data that is required for the memory page in question, or it could only be partial (incomplete) memory address translation data for the memory page. For example, where a multiple level memory page table is being used, the pre-fetched memory page address translation data could be a pointer to the second level page table in a three level system that would then require further translation. Another possibility would be to pre-fetch the first stage translation in a two-stage system, so that only the second stage translation has to happen in "real time". These arrangements could still be useful to limit the number of address translations needed in "real time" to get to the host physical memory address, while allowing for a smaller memory address translation data cache size.

In an embodiment, the memory page access data that is pre-fetched is "complete". Thus, in an embodiment, the memory page access data that is pre-fetched includes the complete (final) memory address translation data for the memory page in question, and any applicable memory protection data for the memory page, such that no further translations dependent on reads from page tables stored in (main) memory should be required. This then ensures that when a read or write is issued to the memory page in question, there should be no incremental latency caused due to the fetching of page tables from (main) memory. (Any additional address mapping not dependent on page tables stored in memory can be carried out without latency cost.)

The information relating to the data for the input surface that will be required by the processing stage that is used by the memory read subsystem to select the memory pages for which the memory page access data is pre-fetched into the cache can be any suitable and desired data that can be used to determine and/or that is indicative of the input surface data that will be required by the display controller.

In an embodiment, the information comprises information indicative of and/or that can be used to determine the data from memory representing the input surface that will actually be used by the display controller to display the input surface. In an embodiment the information comprises information indicative of and/or that can be used to determine the data in the frame buffer for the input surface that will actually be used by the display controller.

The Applicants have recognised in this regard that in many cases the input layer that the display controller will process to generate the output surface (frame) that is to be displayed may and will only comprise part of the input surface in question that has been generated and stored in the frame buffer. Thus not all of the data in the frame buffer for the input surface that the relevant input layer is to be taken from may actually be required by the display controller to generate the output surface for display. Thus, in an embodiment, the memory read subsystem determines which part or parts of the input surface in the frame buffer are actually required for the input layer to be processed to generate the output surface, and then requests the advance loading of the memory page access data for memory pages containing that input surface data (and in an embodiment for only memory pages that contain that input surface data).

The information relating to the data for the input surface that will be required by the processing stage that is used by the memory read subsystem accordingly in an embodiment comprises information that allows the subset of memory pages of the memory pages that store the frame buffer for the input surface that store the input surface data that the input layer is to be formed from to be identified.

This information may comprise, for example, (an indication of) the vertical and horizontal size of the input layer in question (that the input surface in the frame buffer will be used for), the size of the memory pages occupied by the input surface, etc. The memory page size used by a frame buffer may be indicated, e.g., via the driver for the display controller, e.g. by setting this information in the display controller's configuration registers.

The memory read subsystem correspondingly in an embodiment determines whether any frame buffer pages storing an input surface that is to be used as an input layer will not in fact be used for the input layer, and in that case does not issue an advance memory page access data loading request for those frame buffer memory pages.

This can avoid the unnecessary pre-fetching of memory page access data for memory pages that store input surface data that will not in fact be used (and thus avoids the redundant memory system traffic and power that would be caused by loading such memory page access data into the cache unnecessarily).

In an embodiment, the information is information that is indicative of and/or that can be used to determine the order in which the input surface data will be required by the display controller for display, and in particular, and in an embodiment, that allows the order that the memory pages storing the input surface data to be used for the input layer will be needed in to be determined. The Applicants have recognised in this regard, that, depending upon, e.g., whether an input surface is to be rotated or flipped, the order in which the data representing the input surface is required can vary. The technology described herein takes account of this in its embodiments at least, by the memory read subsystem selecting the memory pages storing input surface data whose access data is loaded in advance based, at least in part, on information relating to the order in which the input surface data is to be used by the display controller.

The information relating to the order in which the input surface data is going to be used can comprise any suitable and desired such data, such as one or more of: an indication of any flipping (whether vertical or horizontal) of the input surface, information indicative of any rotation of the input surface, and information indicating the memory stride for the input surface (e.g. whether it is positive or negative), etc.

The memory read subsystem could also or instead use other information relating to the data that will be required for an input surface by the display controller, if desired. For example, where some form of decoding or decompression is to be performed on the input surface, then the memory read subsystem can also use information relating to the decoding or decompression processing to be performed on the input surface to identify the data for the input surface that will be required (and, e.g., and in an embodiment, the order in which that data will be required), and to configure its advance memory page access data loading requests for the input surface accordingly.

Where there is more than one input surface (input layer) to be processed for a given display output, then in an embodiment, the memory read subsystem operates to selectively request the advance loading of memory page access data for memory pages storing the input surface data in the manner of the technology described herein for plural, and in an embodiment for each, of the input surfaces that are required.

Correspondingly, where plural input layers (surfaces) are required for a given display output (output surface), then in an embodiment the memory read subsystem also or instead uses information relating to the way that the plural layers are to be used to select and configure its advance loading of the memory page access data into the cache. In a such embodiment, the memory read subsystem uses information indicative of the location of the layers in the display composition, e.g., and in an embodiment, in terms of the horizontal and vertical offsets of the layers, and/or in terms of the order in which the layers will be used in the display composition, to determine the memory pages that it should request the loading of access data for in advance (and, in an embodiment, the order in which it requests the memory page access data to be loaded).

Thus, in an embodiment, the memory read subsystem also uses information relating to the way that the plural input surfaces will be composed for display by the display controller, such as and in an embodiment, information relating to the location of each input surface in the composited output surface that will be displayed, to select the memory pages for which it requests the advance loading of memory page access data (that it pre-fetches).

The memory read subsystem can be provided with the information relating to the data for the input surface(s) that will be required by the processing stage in any suitable and desired manner. In an embodiment, the memory read subsystem has access to the control information for the display process that is provided to the display controller (e.g., and in an embodiment, that is used to indicate to the processing stage on the display controller the input surfaces to be processed and how those input surfaces are to be processed to provide the output surface (frame) for display). This control information may, e.g., and in an embodiment is, stored in appropriate registers of or accessible to the display controller. Thus, in an embodiment, the memory read subsystem has access to the registers that store control information (and to the control information in the registers) for the display controller and the display process.

Thus, in an embodiment, the memory read subsystem takes as inputs control information, e.g. and in an embodiment that is stored in registers, provided to the display controller to control the processing of the input surfaces to provide the output surface for display, and then uses that control information to determine the memory pages that will need to be fetched for the respective input surfaces to provide the output surface for display, and requests in advance the loading of memory page access data into the cache for those determined memory pages in an appropriate manner (and, in an embodiment, in an order that is based on some or all of the control information).

Other arrangements for providing the information relating to the input surface data that will be required for the display process to the memory read subsystem could, of course, be used if desired.

The memory page access data (e.g. address translation data) loading requests that the memory read subsystem sends can be configured in any suitable and appropriate manner that can be used to trigger the "pre-fetching" of the memory page access, e.g. address translation, data into the memory page access data cache (into the TLB). In an embodiment, the memory page access data loading requests take the form of read requests to the memory management unit of the system, but are identifiable as being memory page access data loading (pre-fetch) requests, rather than actual data read requests. Other arrangements would, of course, be possible.

The pre-fetch memory page access data loading requests sent by the memory read subsystem can be identified as such in any appropriate and suitable manner, e.g. by appropriately flagging those requests (e.g. by providing them with an appropriate particular, in an embodiment selected, in an embodiment predefined, identifier), so that the memory management unit can recognise them as access data loading requests.

The memory page access data loading requests that the memory read subsystem sends should be sent in advance of any requirement for the actual data of the input surface being required. Thus they are in an embodiment sent in advance of any request for the data of the input surface that is stored in the memory page in question (in contrast, e.g., to "on demand" fetching of memory page address translation data into a cache which is triggered when a request for the data itself is made (and the address translation data is found to not already be in the cache (TLB)).

Provided that the pre-fetch memory page access data loading request for any given page is sent before the first actual data request for data on that page, then the pre-fetching, memory page access data loading request can be sent from the memory read subsystem at any suitable and desired time in relation to the overall display operations. In an embodiment, the pre-fetch memory page access data loading request is sent such that the memory page access data will be stored locally in the cache before any data request dependent on that memory page access data (i.e. for data stored in the memory page in question) is issued. In an embodiment the memory page access data request is issued sufficiently in advance that any corresponding dependent data request is unlikely to be exposed to the latency of more than one trip to DRAM (where the page is stored) relative to the time that it is required.

The pre-fetch memory page access data loading requests can be sent by the memory read subsystem in any suitable and desired manner. For example, there could be a direct interface between the memory read subsystem and the system MMU via which the requests are sent. Alternatively or additionally, where (the memory read subsystem of) the display controller includes a DMA read unit, then the memory read subsystem memory page access data loading request could be sent to the DMA read module, which would then, e.g., translate those requests to appropriate memory interface transactions (e.g. AXI read interface transactions) and send them to the system MMU.

Alternatively, the display controller (the memory read subsystem of) the display controller could itself include an MMU which would then itself generate appropriate memory interface transactions to load the memory page access data. In this case, the memory page access data loading request would be effectively generated internally within the memory read subsystem and then the MMU of the memory read subsystem (of the display process controller) would send appropriate memory interface transactions to load the memory page access data into the cache.

Accordingly, the arrangement of the technology described herein can operate however the MMU is arranged in the overall data processing system e.g., irrespective of whether it is in the display controller itself, is not on the display controller but is otherwise arranged in the overall data processing system architecture, or is distributed between the display controller and other components of the overall data processing system.

In response to a memory page access data load request from the memory read subsystem, the appropriate memory system (of the data processing system) should, and in an embodiment does, load the requested memory page access data (e.g. address translation data) into the memory page access data cache of the memory system (for the memory management unit (MMU) in question). This can be done in any suitable and desired manner and may, e.g., and in an embodiment does, comprise copying the memory page access data from the full memory page access data (e.g. the MMU page table) stored in main memory to the local memory page access data cache (TLB). This can be done in any suitable and desired manner for the memory system in question.

Once the memory page access data has been loaded into the cache, then the memory read subsystem can, and in an embodiment does, request data from the memory page for processing (at the appropriate time when the input surface data stored in the memory page in question is required for processing to generate the output surfaces). The data from the memory pages can be requested as desired, e.g., and in an embodiment, using the standard data requesting mechanism for the display controller, memory system, and/or data processing system in question.

As part of this processing, in response to the data request, the memory system will use the memory page access data that has been loaded into the cache to control and/or facilitate the access to the data in the memory page (e.g., and in an embodiment, depending upon the nature of the memory page access data that has been fetched into the memory page access data cache).

For example, where the memory page access data is memory page address translation data, then as part of this processing, in response to the data request, the memory system will use the memory page address translation data that has been loaded into the cache to translate the virtual address used for the memory page to request the data of the memory page to the physical address for that memory page, so that the relevant data can be fetched from its (physical) location in the main memory.

Correspondingly, where the memory page access data in the cache comprises memory protection data, then as part of this processing, in response to the data request, the memory system will use the memory page protection data that has been loaded into the cache to determine whether the permissions for the memory page in question permit the data of the memory page to be fetched from the main memory (or not) (and to then fetch the data (or not) accordingly).

Once the actual data has been read from the memory pages, the display controller can process that data as desired and as required, to generate the desired output surface for display.

This may then be repeated for the next memory page containing input surface data that is required, and so on, until the final output surface has been generated.

In an embodiment the memory read subsystem is operable to keep track of the memory pages as they are being used, and issues its memory page access data (e.g. address translation data) loading requests based, at least in part, on the tracking of the use of the memory pages. In an embodiment, the memory read subsystem tracks the use of the memory pages, and is configured to only issue a request to load memory page access data for a new memory page into the cache when it determines that the use of a memory page for which the access data is already in the cache has been completed.

This facilitates storing the memory page access data for only a more limited number of memory pages in the cache at any given time, as the tracking of the use of the memory pages allows the memory read subsystem to (more) reliably load new memory page access (e.g. address translation) data into the cache as the corresponding memory pages will be required (but without, e.g., the need to pre-emptively store the memory page access data for a large number of memory pages in the cache in advance). This can thus avoid, for example, the need for the system to be able to store in the cache memory page access, e.g. address translation, data for all memory pages containing data for the input surfaces that will be used as input layers at the beginning of the generation of an output surface (frame), as memory page access data for memory pages for the input surfaces can instead be loaded into the cache as the memory pages are required (and the access data for memory pages that are no longer required can more safely be evicted from the cache).

This may be particularly useful where the memory read subsystem, as in embodiments of the technology described herein, has access to information indicating and can determine the order in which the memory pages for the input surfaces will be used for the display process.

Thus, in an embodiment, the memory read subsystem uses information indicating the order that the memory pages containing the input surface data will be required in for the display process, together with tracking of the use of the memory pages, to control and select both the order that it issues its memory page access data loading requests, and the timing of those requests.

In an embodiment, a new memory page access data loading request is only sent once it is determined that a memory page whose access data is already stored in the cache is no longer required. For example, and in an embodiment, when the display controller starts to access input surface data from a new memory page (thereby indicating that a previous memory page is no longer required), a request to load the access data for a new memory page (and in an embodiment for the next memory page whose access data is not already stored in the cache in the memory page processing order) is in an embodiment sent by the memory read subsystem (and so on).

Correspondingly, in an embodiment, the memory page access data for a memory page whose data is no longer required in an embodiment can be, and in an embodiment is, evicted from the cache. In an embodiment when the display controller starts to access input surface data from a new memory page (thereby indicating that a previous memory page is no longer required), the access data for a new memory page that is loaded into the memory page access data cache in response thereto in an embodiment replaces access data of another memory page that is already stored in the access data cache.

In this arrangement, the memory page access data that is evicted from the cache can be selected using any suitable and desired allocation scheme. In an embodiment, a least recently used (LRU) allocation scheme is used to discard the existing memory page access data entry in the cache when a new memory page access data entry is to be loaded into the cache. Indeed, it is an advantage of the technology described herein that relatively simple allocation schemes, such as LRU schemes, can be used for this purpose, rather than the memory page access data entries needing to be invalidated in any more sophisticated manner.

These arrangements can allow the number of memory pages for which access data needs to be stored in the memory page access data cache concurrently (the number of memory access data entries that the cache needs to support) to be (potentially significantly) reduced.

Correspondingly, as the number of memory page access data entries that need to be stored in the cache concurrently can be reduced, the size of the memory page access data cache (e.g. the translation lookaside buffer (TLB)) that is required in the memory management unit to cache the memory page access data can correspondingly be reduced.

For example, to cache address translation entries for an entire frame buffer storing an input surface for a 4 kb resolution display, using 4 kb memory pages, would require more than 8000 address entries to be cached for each display layer. However, where, as in these embodiments of the technology described herein, the memory read subsystem can keep track of the memory pages as they are used, such that only a more limited number of memory page address translation data entries needs to be stored in the cache concurrently, then the size of the cache (the TLB) that stores the address translation data can correspondingly be (significantly) reduced.

In an embodiment the system is configured such that only a particular, in an embodiment selected, and in an embodiment predetermined, number of memory access data, e.g. address translation data, entries can be stored in the memory access data cache at the same time (e.g., and in an embodiment, in respect of each input layer that is to be processed, and/or in total for the display processing operation). In one embodiment, the maximum number of memory page access data entries that can be stored in the cache at any given time for a given input layer is four. However, other arrangements would, of course, be possible, if desired.

In this case, at the beginning of the generation of the output surface, for a given (and each) input layer, the memory page access, e.g. address translation, data for four memory pages would in an embodiment be loaded into the cache, and then memory page access, e.g. address translation, data for new memory pages would be loaded into the cache by the memory read subsystem singly (and in turn), as usage of one of the previously loaded memory page access, e.g. address translation, data entries finishes.

In an embodiment, the number of memory page access data entries that can be concurrently be loaded in advance into the cache is configurable in use. This would then allow that number of memory page access data entries to, e.g., be configured to match the number of memory page access data entries that the system MMU cache (TLB) can, and/or is desired to be permitted to be able to, store simultaneously. Such configuration of the memory read subsystem operation can be performed as desired. In an embodiment this is done under some form of software control, e.g. by setting an appropriate parameter for the memory read subsystem. For example, and in an embodiment, the driver for the display controller could be configured to determine the size of the MMU memory page access data, e.g. address translation, cache (TLB), and/or to configure the desired size of the MMU memory page access data, e.g. address translation, cache (TLB), and then configure the display controller (and the memory read subsystem) accordingly.

Thus, in an embodiment, there is a particular, in an embodiment selected, and in an embodiment predefined, number of memory page access data entries that are loaded into the memory page access data cache at the beginning of the processing for a given input layer (input surface), and then only that number of access data entries (or less than that number of access data entries) is kept loaded in advance for that input layer during the output frame processing. This number of memory page access data entries in an embodiment corresponds to the number of entries available in the system MMU cache for memory page access data entries (of the type in question) for an input layer (e.g. the size of the (relevant portion of the) TLB (translation look-aside buffer) in the system MMU).

In an embodiment, the number of memory page access data entries that are retained in the cache concurrently is based on and selected to be a number of such entries that need to be in the cache at any given time to keep the pre-fetch point for the memory page access data sufficiently ahead of the use of the data in the memory pages to "hide" any page table walk latency.

It will be appreciated from the above, that in embodiments of the technology described herein, the memory page access data cache (TLB) can be configured to store only memory page access data for a limited number of memory pages and can be managed (e.g. in terms of adding memory page access data for new memory pages and replacing memory page access data for previous memory pages) in a relatively simple manner. This then means that, e.g., using content addressable memory with an advanced replacement policy to maximise the "hit" rate is not necessary for the memory page access data cache, such that the technology described herein can be implemented with a significant reduction in area and complexity compared to, for example, the use of fully content addressable memory for the cache.

Thus, in an embodiment, the memory page access data cache is not (is other than) a content-addressable memory cache (a general purpose cache), and is in an embodiment in the form of a managed buffer (that is in an embodiment managed in the manner discussed above).

Correspondingly, the memory page access data (TLB) entries are in an embodiment tagged as they are pre-fetched, and any data request dependent on a tagged entry is in an embodiment given the same tag to indicate which access data is required, with the tags being re-used in order to evict an entry when it is no longer required.

This facilitates the memory page access data cache being configured and operated in a relatively simple manner (essentially as a managed buffer rather than a general purpose cache), thereby accordingly saving area and power, whilst still avoiding circumstances under which a memory page access data entry is accidentally evicted from the cache. This is possible because of the operation of the technology described herein that uses the (predictable) sequence of use of the memory pages (the memory page scan pattern) to determine the memory pages for which to pre-fetch the memory page access data.

As well as the particular functionality discussed above relating to the advanced loading of (the pre-fetching of) memory page access data for an input surface or surfaces, the memory read subsystem of the display controller can otherwise function as desired and include any suitable and desired elements and components of such subsystems, such as, for example, and in an embodiment, appropriate latency hiding buffers, a Direct Memory Access (DMA) read controller, etc.

Each input surface read by the memory read subsystem (that is used as an input layer by the display controller) may be any suitable and desired such surface, such as, and in an embodiment, an image, e.g. frame, for display.

The input surface or surfaces can be generated as desired. For example the one or more input surfaces may be generated by being appropriately rendered and stored into a memory (e.g. frame buffer) by a graphics processor. Additionally or alternatively, one or more input surfaces may be generated by being appropriately decoded and stored into a memory (e.g. frame buffer) by a video codec. Additionally or alternatively, one or more input surfaces may be generated by a digital camera image signal processor (ISP), or other image processor. The input surface or surfaces may be, e.g., for a game, a demo, a graphical user interface (GUI), a GUI with video data (e.g. a video frame with graphics "play back" and "pause" icons), etc.

The memory in which an input surface(s) is stored once it is generated may comprise any suitable memory and may be configured in any suitable and desired manner. For example, it may be a memory that is on-chip with the display controller or it may be an external memory. In an embodiment it is an external memory, such as a main memory of the overall data processing system. It may be dedicated memory for this purpose or it may be part of a memory that is used for other data as well. In an embodiment at least one or each input surface is stored in (and read from) a frame buffer.

The output surface generated by the processing stage may be any suitable and desired such surface. There may only be one input surface that is read and processed to generate a given output surface, but in an embodiment there are plural (two or more) input surfaces that are read and processed to generate the output surface. In embodiments, the output surface is composited from plural input surfaces.

The processing stage may be operable to process an input surface or surfaces to generate an output surface in any desired and suitable manner.

In an embodiment, the processing stage is operable to compose (two or more) input surfaces to generate a composited output surface.

The processing stage may also or instead, and in an embodiment also, be operable to decode (e.g. decompress) an input surface, e.g. to generate one or more decoded (e.g. decompressed) input surfaces, and/or to rotate an input surface, e.g. to generate one or more rotated input surfaces.

In an embodiment, the processing stage is also or instead, and in an embodiment also, operable to scale (e.g. upscale and/or downscale) one or more surfaces, e.g. to generate one or more scaled surfaces. The "scaled" surface(s) may be an input surface or surfaces and/or the output surface.

The processing stage in an embodiment comprises one or more layer pipelines operable to perform one or more processing operations on one or more input surfaces, as appropriate, e.g. before providing the one or more processed input surfaces to a scaling stage and/or composition stage, or otherwise. Where the display controller can handle plural input layers, there may be plural layer pipelines, such as a video layer pipeline or pipelines, a graphics layer pipeline, etc. These layer pipelines may be operable, for example, to provide pixel processing functions such as pixel unpacking, colour conversion, (inverse) gamma correction, and the like.

The display controller may also include a post-processing pipeline operable to perform one or more processing operations on one or more surfaces, e.g. to generate a post-processed surface. This post-processing may comprise, for example, colour conversion, dithering, and/or gamma correction.

The display controller may also include a compression stage operable to compress one or more surfaces, e.g. to generate one or more compressed surfaces.

Thus, as will be appreciated from the above, the processing stage may, and in an embodiment does, comprise a plurality of processing stages or elements, and in an embodiment comprises one or more of, and in an embodiment all of: a composition stage (engine), a scaling stage (engine), a decoding stage (decoder), a rotation stage (engine), one or more post-processing stage or stages, and a compression stage.

It would also be possible for one or more or all of these stages to be provided in other elements of the display controller. For example, the memory read subsystem could include a decoding stage and/or a rotation stage operable to decode and rotate input surfaces before they are provided to the processing stage.

Correspondingly, the processing of the input surface(s) to generate an output surface in an embodiment comprises one or more of and in an embodiment all of: decoding, rotation, composition, and scaling. The output surface may, e.g., be subjected to post-processing, and compression.

In an embodiment, the display controller in an embodiment comprises one or more data flow controllers operable to selectively transmit (direct) (the data of) one or more surfaces to the various stages of the display controller. The one or more data flow controllers may be provided as part of an overall (centralised) control module of the display controller, or may be provided as one or more separate units that are in an embodiment controlled by an overall control module of the display controller. Equally, the data flow controller may itself be a single unit or may comprise multiple units, i.e. may be distributed. Other arrangements would, of course, be possible.

The output stage of the display controller of the technology described herein may be any suitable output stage operable to provide an output surface for display to a display, e.g. to cause the output surface for display to be displayed on the display. The output stage in an embodiment comprises a display processing pipeline that performs the necessary display processing operations on the output surface to be displayed. The output stage in an embodiment comprises appropriate timing control functionality (e.g. it is configured to send pixel data to the display with appropriate horizontal and vertical blanking periods), for the display.

The display that the display controller of the technology described herein is used with may be any suitable and desired display, such as for example, a screen. It may comprise the overall data processing system's (device's) local display (screen) and/or an external display. There may be more than one display output, if desired.

In an embodiment, the display controller in an embodiment comprises a write-out stage operable to write an output surface to external memory. This will allow the display controller to, e.g., (selectively) write out an output surface to external memory (such as a frame buffer), e.g. at the same time as an output surface is being displayed on the display.

The various stages of the display controller of the technology described herein may be implemented as desired, e.g. in the form of one or more fixed-function units (hardware) (i.e. that is dedicated to one or more functions that cannot be changed), or as one or more programmable processing stages, e.g. as programmable circuitry that can be programmed to perform the desired operation. There may be both fixed function and programmable stages.

One or more of the various stages of the technology described herein may be provided as separate circuit elements to one another. Additionally or alternatively, some or all of the stages may be at least partially formed of shared circuitry.

It would also be possible for the display controller to comprise, e.g., two display processing cores, each configured in the manner discussed above (i.e. having an appropriate memory read subsystem, processing stage and output stage, etc.), if desired.

In an embodiment, the display controller of the technology described herein forms part of a data processing system. Thus, another embodiment of the technology described herein comprises a data processing system comprising a display controller that is in accordance with the technology described herein.

The data processing system in an embodiment comprise one or more of, and in an embodiment all of: a central processing unit, a graphics processing unit, a video processor (codec), a system bus, and a memory controller.

The display controller and/or data processing system may be, and in an embodiment is, configured to communicate with one or more of (and the technology described herein also extends to an arrangement comprising one or more of): an external memory (e.g. via the memory controller), one or more local displays, and/or one or more external displays. The external memory in an embodiment comprises a main memory (e.g. that is shared with the central processing unit (CPU)) of the overall data processing system.

Thus, in some embodiments, the display controller and/or data processing system comprises, and/or is in communication with, one or more memories and/or memory devices that store the data described herein, and/or store software for performing the processes described herein. The display controller and/or data processing system may also be in communication with and/or comprise a host microprocessor, and/or with and/or comprise a display for displaying images based on the data generated by the display controller.

Correspondingly, an embodiment of the technology described herein comprises a data processing system comprising:
a main memory;
a memory management unit operable to translate virtual addresses used for accessing data stored in the main memory to physical addresses for that data in the main memory;
a memory page access data cache of or accessible to the memory management unit operable to store memory page access data for use by the memory management unit when accessing data in memory pages;
a display;
one or more processing units operable to generate input surfaces for display and to store the input surfaces in the main memory; and
a display controller, the display controller comprising:
a memory read sub-system operable to read data of input surfaces to be processed by the display controller;
a processing stage operable to process one or more read input surfaces to generate an output surface; and
an output stage operable to provide an output surface for display to a display;
wherein:
the memory read sub-system is operable to request in advance the loading of memory page access data for memory pages storing data relating to an input surface to be read and processed by the display controller to generate an output surface into the memory page access data cache, the memory read sub-system being operable to select the memory pages that it requests the advance loading of memory page access data for based on information relating to the data for the input surface that will be required by the processing stage to generate the output surface.

As will be appreciated by those skilled in the art, the technology described herein can and in an embodiment does include one or more, and in an embodiment all, of the features of the technology described herein.

Thus, for example, the memory page access data cache of or accessible to the memory management unit operable to store memory page access data for use by the memory management unit when accessing data in memory pages in an embodiment comprises a memory address translation data cache of or accessible to the memory management unit operable to store address translation data for use by the memory management unit to translate virtual addresses used for data in the main memory to physical addresses in the main memory for that data.

The display controller of the technology described herein may be operated in any appropriate and desired manner.

In use of the display controller and data processing system of the technology described herein, one or more input surfaces will be generated, e.g., and in an embodiment, by a GPU, CPU and/or video codec, etc. and stored in memory. Those input surfaces will then be processed by the display controller to provide an output surface for display. As part of this processing the display controller will determine in the manner discussed above those memory pages storing data of the input surfaces that is required as input layers to the output surface generation process, and send requests to load access, e.g. address translation, data for those memory pages into the memory page access data cache in advance, accordingly. Thereafter, the display controller will request and fetch the input surface data from the memory pages and process that data appropriately to form the output surface. The output surface will then be sent to a display for display.

In embodiments, as discussed above, the display controller will also track the use of the memory pages, and load memory page access, e.g. address translation, data for new pages into the cache (and evict address access data for used pages from the cache) as the memory pages are no longer required.

This process will then be, and is in an embodiment repeated for the next output surface (frame) to be displayed, and so on, so that a sequence of output frames can be displayed.

Thus, in an embodiment, the method of the technology described herein comprises (and the display controller is configured to) once memory page access, e.g. address translation, data for a memory page has been loaded into the memory page access data cache, subsequently requesting data from that memory page, reading in the input surface data from that memory page, and processing the read input surface data to generate output surface data, and then providing the appropriate output surface data for display.

As will be appreciated from the above, the technology described herein, in its embodiments, is applicable to (and advantageous for) systems that need real time operation (constant bandwidth), for example where the input surface processing element is tied to an external element that enforces a fixed bandwidth, particularly where the bandwidth is high relative to the available system bandwidth (such that it may then be hard to maintain constant bandwidth if there are disruptions in service caused by waits for memory page access, e.g. address translation, data).

A display controller is one example of a component where these factors apply (as the display controller is tied to the screen that enforces a fixed bandwidth). Another example of this is an image signal processor (ISP) (in this case the camera sensor enforces a fixed bandwidth on the image signal processor).

In particular, the operation in the manner of the technology described herein can reduce or eliminate variable latency where memory access to an input surface can be predicted (there is a predictable memory access pattern), particularly where the memory page access data walk bandwidth is low relative to the system bandwidth.

Thus, although the technology described herein has been described above with particular reference to the use of the techniques of the technology described herein for display controller operation, the Applicants have recognised that the techniques of the technology described herein can equally and correspondingly be used for other situations where data of input surfaces to be processed may be fetched for processing (and in particular where that operation is subject to similar constraints and conditions to display controller operation).

The technology described herein accordingly extends to the use of the techniques of the technology described herein more generally than for display controllers.

Thus, another embodiment of the technology described herein comprises a processing unit for a data processing system, the processing unit comprising:

a memory read sub-system operable to read data of input surfaces to be processed by the processing unit;

a processing stage operable to process one or more read input surfaces to generate an output surface; and an output stage operable to provide an output surface; wherein:

the memory read sub-system is operable to request in advance the loading of memory page access data for memory pages storing data relating to an input surface to be read and processed by the processing unit to generate an output surface into a memory page access data cache, the memory read sub-system being operable to select the memory pages that it requests the advance loading of memory page access data for based on information relating to the data for the input surface that will be required by the processing stage to generate the output surface.

Another embodiment of the technology described herein comprises a method of operating a processing unit of a data processing system, the processing unit comprising:

a memory read sub-system operable to read data of input surfaces to be processed by the processing unit;

a processing stage operable to process one or more read input surfaces to generate an output surface; and an output stage operable to provide an output surface;

the method comprising, when the processing unit is to generate an output surface from one or more input surfaces:

the memory read sub-system:

using information relating to the data for the input surface or surfaces that will be required by the processing stage to generate the output surface to determine one or more memory pages storing data relating to the input surface or surfaces that will be used by the processing stage to generate the output surface; and requesting the loading of memory page access data for the determined memory pages storing data relating to an input surface to be read and processed by the processing unit to generate an output surface into a memory page access data cache in advance of a request for the data of the input surface that is stored in the memory pages in question.

As will be appreciated by those skilled in the art, these embodiments of the technology described herein can, and in an embodiment do, include any one or more or all of the features of the technology described herein. Thus, for example, the processing unit is in an embodiment a display controller or an image signal processor. Correspondingly, the memory page access data is in an embodiment of the form discussed above, and the information relating to the data for the input surface that will be required is in an embodiment of the form discussed above, etc.

The output surface may, e.g., be output for display to a display, stored, e.g. in a (frame) buffer, provided to another processing unit for processing, etc.

The technology described herein should (an in an embodiment does) produce a useful output in the form of an output surface (e.g. an image) that can be provided to a display for display.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and stages of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the display controller can otherwise include any one or more or all of the usual functional units, etc., that display controllers include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will be appreciated that not all steps of the methods of the technology described herein need be carried out by computer software and thus in an embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described with reference to FIG. 3.

Figure 3:
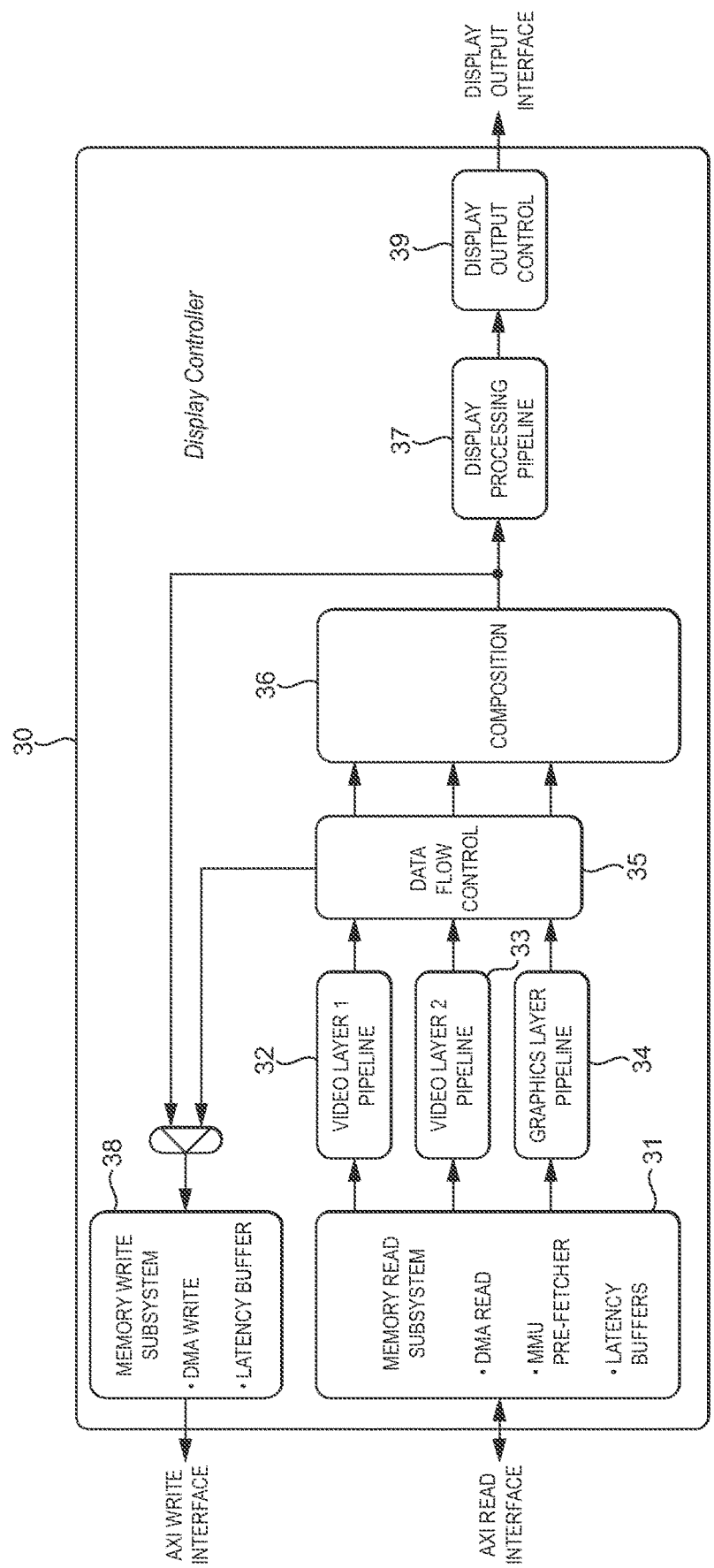
FIG. 3 shows schematically a display controller in accordance with an embodiment of the technology described herein.

FIG. 3 shows schematically a display controller 30 in accordance with an embodiment of the technology described herein. In FIG. 3, the boxes represent functional units of the display controller, while the arrowed lines represent connections between the various functional units. The display controller 30 may be used in a data processing system, e.g. of the form shown in FIG. 1.

As shown in FIG. 3, the display controller 30 comprises a memory read subsystem 31 that includes, inter alia, a read controller in the form of a Direct Memory Access (DMA)

read controller. The read controller is configured to read one or more input surfaces from one or more frame buffers in a main memory 3 (not shown in FIG. 3) via a memory bus.

The memory read subsystem 31 further comprises one or more real-time FIFO (first-in-first-out) modules which are used to buffer the one or more input surfaces as they are read from memory, e.g. for latency hiding purposes.

In accordance with the technology described herein, the memory read subsystem 31 of the display controller 30 of the present embodiment is also operable to be able to request in advance the loading of (to pre-fetch) memory page access data, which in the present embodiments is in the form of address translation data, for memory pages that store data of any input surfaces that will be required for use as input layers for generating an output surface to be displayed. This operation will be described in more detail below.

In this embodiment, the memory read subsystem 31 is configured to provide (read) up to three different input surfaces for use as input layers which are to be used to generate a composited output frame. The three input layers may comprise one or more video layers, e.g. generated by a video processor (codec) 1, and one or more graphics layers, e.g. graphics windows generated by a graphics processing unit (GPU) 2, and so on. Hence, FIG. 3 shows the display controller 30 comprising three layer pipelines 32, 33, 34 which will each receive data from an input surface to be used as a display layer. Any or all of the input surfaces received by the layer pipelines may have been subjected to decoding by a decoder and/or rotation by a rotation unit, if desired.

Each layer pipeline 32, 33, 34 performs appropriate operations on the received surfaces, such as pixel unpacking from the received data words, colour (e.g. YUV to RGB) conversion, and inverse gamma or inverse sRGB correction.

Although the embodiment of FIG. 3 illustrates the use of three layer pipelines (and therefore up to three input layers), it will be appreciated that any number of layer pipelines may be provided and used in the technology described herein, depending on the application in question (and also depending on any silicon area constraints, etc.).

The display controller 30 further comprises a composition unit 36 that can receive inputs from the layer pipelines 32, 33, 34 and operates to compose the received input layers to generate a composited output surface, e.g. by appropriate alpha blending operations, etc.

The layer processing pipelines 32, 33, 34 and the composition unit 36 together act as a processing stage of the display controller 30 that takes data of input surfaces read by the memory read subsystem 31 and produces from that data an output surface, e.g. for display.

The composited output frames from the composition unit 36 may be onwardly transmitted to a display processing (post-processing) pipeline 37 for display, and/or to a memory write subsystem 38, as desired.

The display pipeline 37 is configured to selectively carry out any desired processing operation(s) on the composited output surface (frame), and to then transmit the (processed) composited output frame for appropriate display on the associated display.

The display processing pipeline 37 may, for example, comprise a colour conversion stage operable to apply a colour conversion to the composited output frame, a dithering stage operable to apply dithering to the composited output frame, and/or a gamma correction stage operable to carry out gamma correction on the composited output frame.

The display processing pipeline 37 also comprises appropriate display timing functionality. Thus, the display processing pipeline 37 is configured to send pixel data to the display outputs 39 with appropriate horizontal and vertical blanking periods. Horizontal and vertical synchronization pulses (HSYNC, VSYNC) are generated together with a DATAEN signal which is asserted in non-blanking periods. In blanking periods DATAEN is de-asserted and no data is sent to the display (there are 4 blanking periods: horizontal front porch—before the HSYNC pulse, horizontal back porch—after the HSYNC pulse, vertical front porch—before the VSYNC pulse, and vertical back porch—after the VSYNC pulse).

The display output 39 may, e.g. interface with a local display of the data processing system (e.g. of the mobile device, smart phone, tablet, etc., that the data processing system is part of).

The display processing pipeline 37 and display output control interfaces 39 accordingly act as an output stage for the display controller 30 for providing output surfaces for display to a display.

The memory write subsystem 38 of the display controller 30 is operable to write surfaces, e.g. generated by the composition unit 36, that it receives, out to external memory 3 (a frame buffer in external memory 3) via a memory bus. This then allows the display controller 30 to, as well as providing output frames for display, also write those output frames to main memory, if desired. To facilitate this operation, the memory write subsystem 38 includes a DMA write controller. In the present embodiment, it also comprises appropriate FIFOs to act as latency hiding buffers.

The display controller 30 also includes a data flow control module 35 that is operable to direct the data flows through the display controller, i.e. to provide the input layers, composited output surfaces, etc., to the appropriate units for processing as shown in FIG. 3. In the present embodiment, the data flow controller 35 operates under appropriate software control, e.g., and in an embodiment, from a driver for the display controller that is running on a host processor (e.g. the CPU 7) of the overall data processing system that the display controller 30 is part of. The driver may generate appropriate commands for the data flow controller 35 and program control registers of the display controller 30 in response to, e.g., commands and data for display processing received from an application running on the host processor.

Other arrangements in this regard, would, of course, be possible.

As discussed above, when the display controller 30 is to provide an output frame for display, it will read in data of one or more input surfaces that have been generated, e.g., by video codec 1 and/or GPU 2, and which are stored in respective frame buffers in the main memory 3, to act as input layers in its output surface generation process, process that input surface data (e.g. by compositing it into an output frame) and provide the (composited) output frame to the display for display via the display processing pipeline 37.

The memory read subsystem 31 of the display controller 30 acts to read in the input surface data that will form the input layers used to generate the output surface. To do this, the memory read subsystem 31 will send a read request to the memory management unit of the data processing system that the display controller is part of.

In the present embodiments, a virtual memory addressing arrangement is used, such that the read requests from the memory read subsystem 31 of the display controller 30 will identify the memory pages containing the data that it wishes to read using virtual addresses which are then translated by the memory management unit for the memory system of the data processing system to the physical memory addresses (memory pages) where the data is stored. Furthermore, to facilitate this operation, the memory management unit has associated with it a memory page address translation data cache in the form of a translation lookaside buffer, in which a subset of the full set of memory page address translation data can be stored, so that that address translation data is more readily available in that cache when a memory read request is sent.

In the present embodiment, the memory read subsystem 31 of the display controller 30 is operable to be able to request in advance the loading of memory page address translation data into the address translation cache (translation lookaside buffer) for memory pages containing input surface data that is required for an input layer, i.e. to pre-fetch the address translation data into the cache (TLB) for memory pages storing input surface data that will be used to generate an output surface. Moreover, the memory read subsystem 31 selects the memory pages that it requests the advance loading of the address translation data into the cache for (that it pre-fetches the address translation data for) based on information relating to the data for the input surfaces that will be required to generate the output surface (frame).

To do this, the memory read subsystem 31 has access to the control information for the display processing that the display controller 30 is to perform for generating the required output surface. This control information may, e.g., be stored in appropriate registers of or accessible to the display controller, with the memory read subsystem being granted appropriate access to those registers as well. Other arrangements would, of course, be possible.

Thus, the memory read subsystem 31 has access to the control information provided to the display controller to control the processing of the input surfaces to generate the required output surface for display, and then uses that control information to determine the memory pages containing data for the respective input surfaces that will be needed to provide the output surface for display, and issues memory page address translation data loading requests in advance for those determined memory pages.

The control information that is used by the memory read subsystem 31 to configure its advance memory page address translation data loading requests can be any suitable and desired control information that is indicative of and/or can be used to determine the data of the input surfaces that will actually be required to generate an output surface.

In the present embodiment, this control information comprises control parameters for each input layer that is to be used to generate the output surface, and control parameters for the display composition, such as the location of each layer in the composition for the output surface. The display layer information in an embodiment comprises information such as the number of valid bytes in each line, whether the layer is subject to any rotation, flipping or compression, the size of the memory pages occupied by the layer, etc. Other forms of control information could also or instead be used, if desired.

Examples of how this control information can be used by the memory read subsystem 31 to select memory pages storing input surface data for which to load address translation data into the cache (the TLB) of the MMU in advance will be discussed in more detail below.

Once the memory read subsystem 31 has determined from the control information which memory pages storing input surface data it wishes to load address translation data into the cache (the TLB) of the MMU in advance for, it sends a corresponding address translation data load request to load the relevant address translation data from the overall set of that data (that will, e.g., be stored in the main memory of the overall data processing system that the display controller is part of) into the cache (the TLB). In the present embodiment, these memory page address translation data loading requests take the form of read requests to the memory management unit of the system, but are flagged (identified) as being memory page address translation data advance loading (pre-fetch) requests, rather than actual data read requests. Other arrangements would, of course, be possible.

Once the address translation data for a memory page has been loaded into the cache in response to a memory page address translation data loading request, then the memory read subsystem 31 can request and read data from that memory page for use as input layer data by the display controller 30. This may be done in any suitable and desired manner, for example by issuing data read requests to the memory system.

The memory read subsystem 31 of the display controller 30 can be configured in a number of different ways to be able to issue the advance memory page address translation data loading requests. FIGS. 4-7 show a number of different embodiments of the memory read subsystem 31 for this purpose. (FIGS. 4-7 show only the elements in the memory read subsystem 31 that are relevant to this operation for ease of illustration.)

Figure 4:
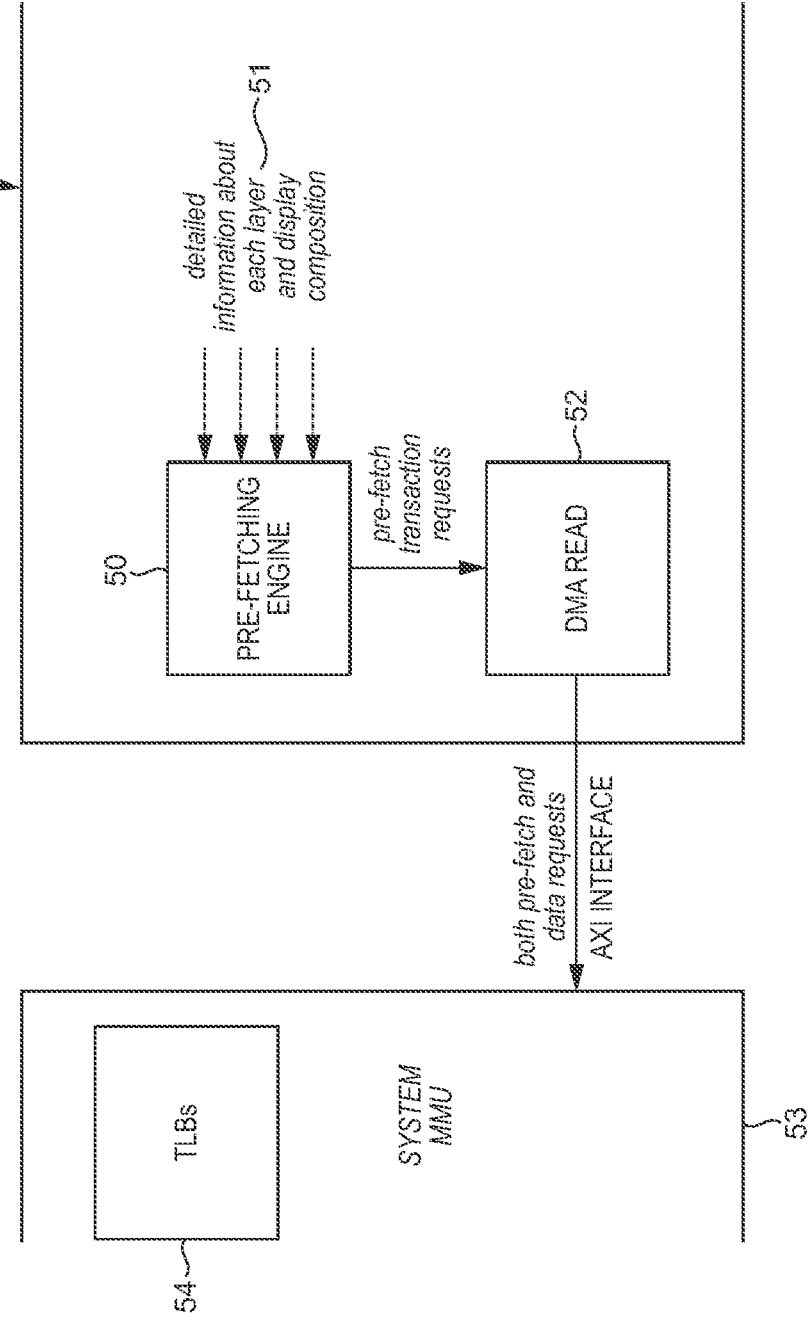
FIGS. 4-7 show exemplary embodiments of the memory read subsystem of the display controller of FIG. 3.

FIG. 4 shows an embodiment in which the memory read subsystem 31 includes a pre-fetching engine 50 that receives the control information 51 relating to the input layer processing that is to be performed for generating the output surface. The pre-fetching engine generates appropriate memory page address translation data loading (pre-fetch) transaction requests and sends those to a DMA read controller 52 of the memory read subsystem 31. The DMA read controller 52 then forwards the pre-fetch memory page address translation data loading requests to pre-fetch the desired memory page address translation data into the TLB 54 of the memory management unit (MMU) 53 (and any subsequent data requests for the actual data of the input surfaces stored in the memory pages for which the address translation data has been loaded into the cache (TLB) 54) to the memory management unit (MMU) 53 for the main memory of the data processing system.

Figure 5:
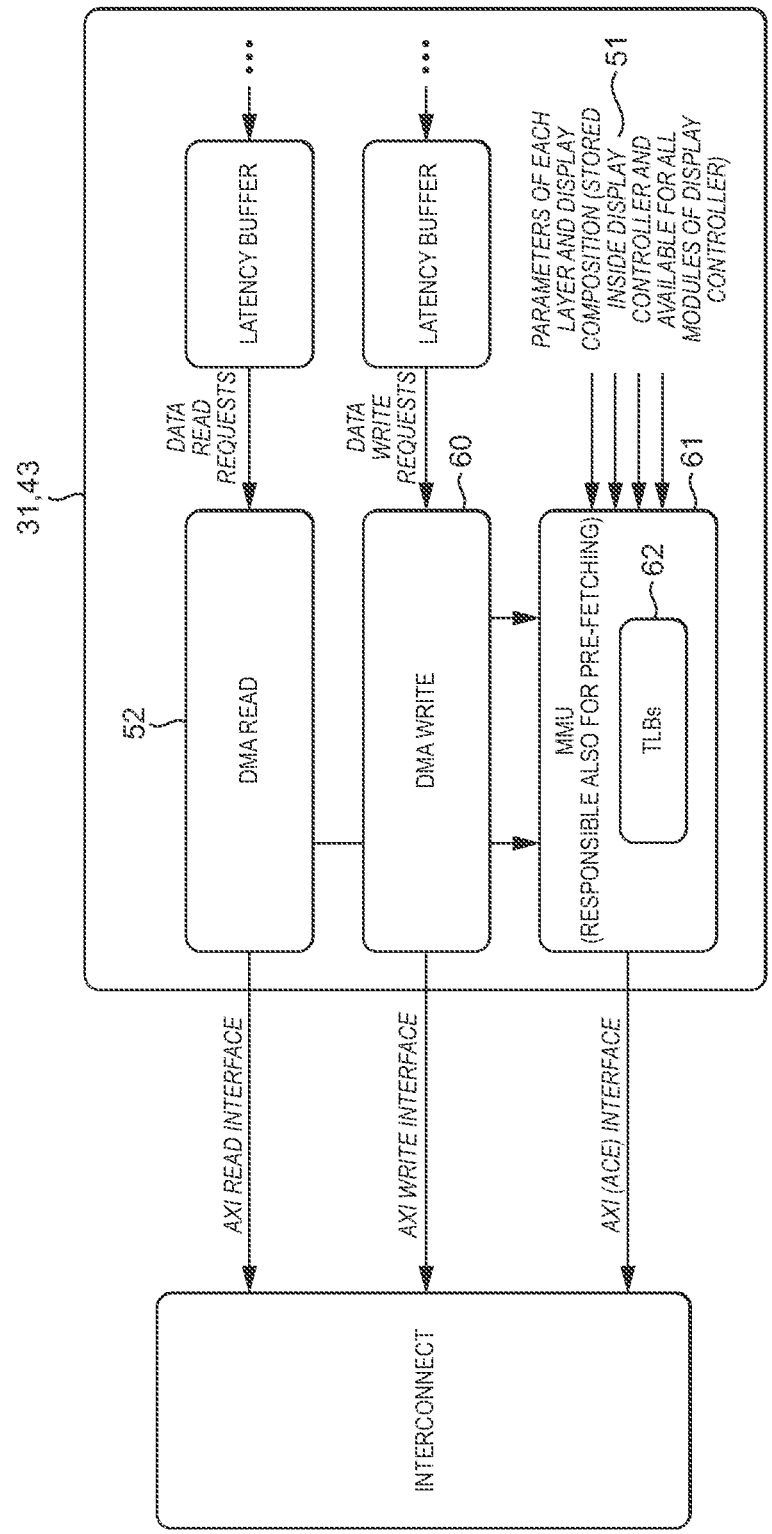

FIG. 5 shows another embodiment of this operation of the memory read subsystem. In this case, elements of both the memory read subsystem 31 and of the memory write subsystem 43 of the display controller 30 are shown.

As shown in FIG. 5, the memory read subsystem 31 again includes a DMA read controller 52 that is operable to fetch data from memory pages. FIG. 5 also shows the corresponding DMA write controller 60 of the memory write subsystem 43.

As shown in FIG. 5, in this embodiment the memory read subsystem 31 and memory write subsystem 43 also comprise a memory management unit 61 which includes the memory page address translation data cache (TLB) 62 and, inter alia, is responsible for transmitting the memory page address translation data loading (pre-fetching) requests in response to the control information 51 about the input layers, etc., that will be used when generating an output surface. In this arrangement therefore the MMU functionality is provided within the display controller 30 itself.

Figure 6:
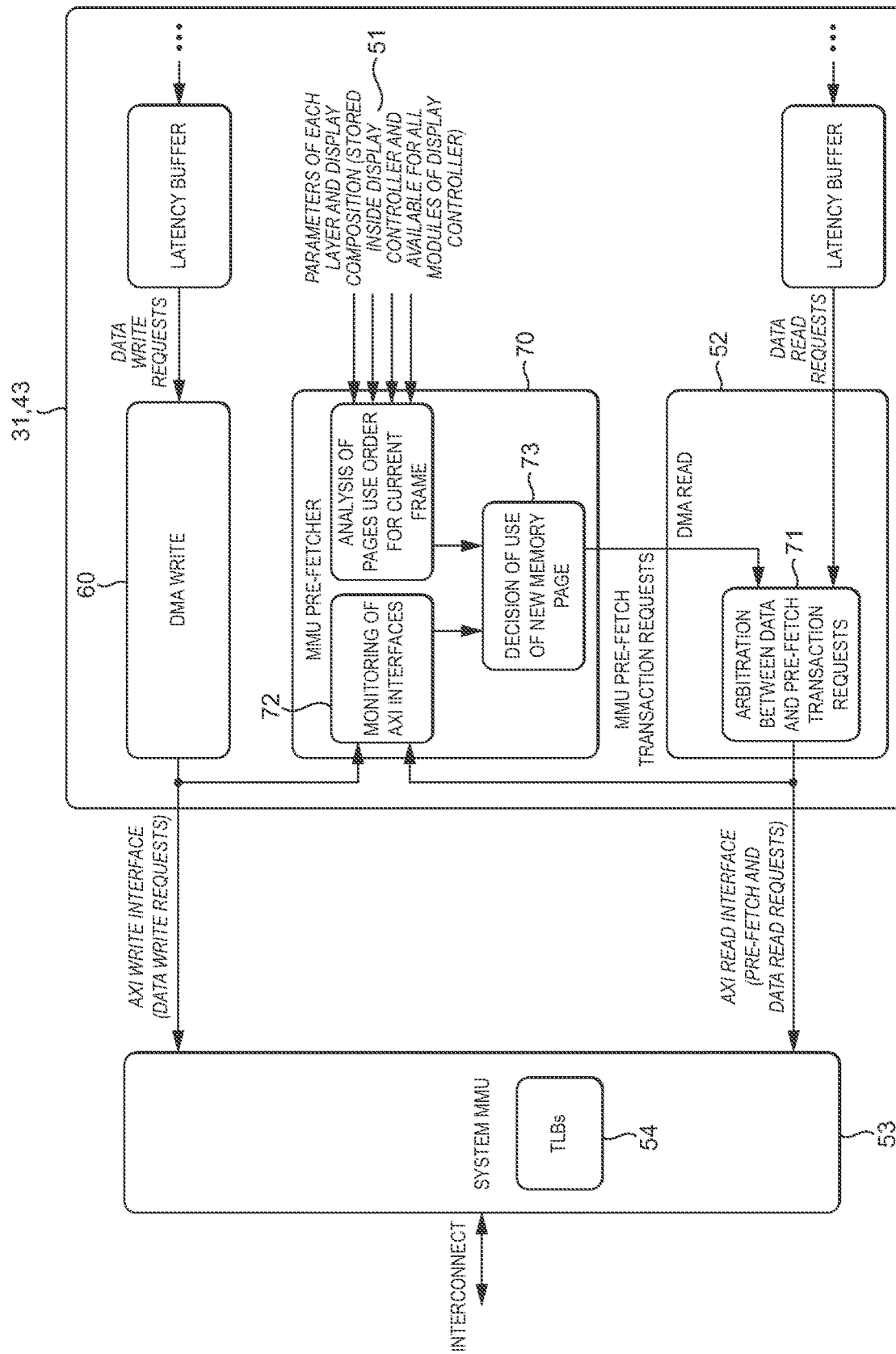

FIG. 6 shows an embodiment of the memory read subsystem 31 and memory write subsystem 43 of the display controller 30. In this embodiment, the memory read subsystem 31 and memory write subsystem 43 of the display controller include an MMU pre-fetcher 70 that uses the control information 51 relating to the input layers that are required and generates appropriate memory page address translation data loading (pre-fetch) requests based on that information.

In the arrangement shown in FIG. 6, the MMU pre-fetcher 70 sends its memory page address translation data loading (pre-fetch) transaction requests to the DMA read controller 52 of the memory read subsystem 31, which DMA read controller 52 then sends those memory page address translation data loading (pre-fetch) transaction requests to the MMU 53 for the main system memory. (The MMU 53 will then load the address translation data into its TLB 54, appropriately.)

As shown in FIG. 6, to facilitate this operation, the DMA read controller 52 includes appropriate arbitration circuitry that can arbitrate between the memory page address translation data loading (pre-fetch) transaction requests from the MMU pre-fetcher 70 and any actual data read requests that are to be sent to fetch actual input surface data for processing.

FIG. 6 also shows that the MMU pre-fetcher 70 is operable to monitor the memory transactions that are taking place via the system MMU 53 (and includes monitoring circuitry 72 for this purpose), and correspondingly includes decision circuitry 73 that is operable to determine when and whether to send new memory page address translation data loading requests based on the monitoring of the memory transactions.

In the present embodiment, the memory transaction monitoring circuitry 72 monitors the addresses used in memory read requests sent by the memory read subsystem 31 for input surface data, and is operable to identify when a new memory page starts to be addressed. This then allows the monitoring circuitry 72 to determine when the display controller 31 has started to read data from a new memory page, and accordingly that a previous memory page has been finished with (is no longer required). As will be discussed in more detail below, this tracking of the use of the memory pages can then be used to facilitate the progressive loading into the cache (and evicting from the cache) of address translation data for memory pages containing input surface data that is required for an input layer.

Figure 7:
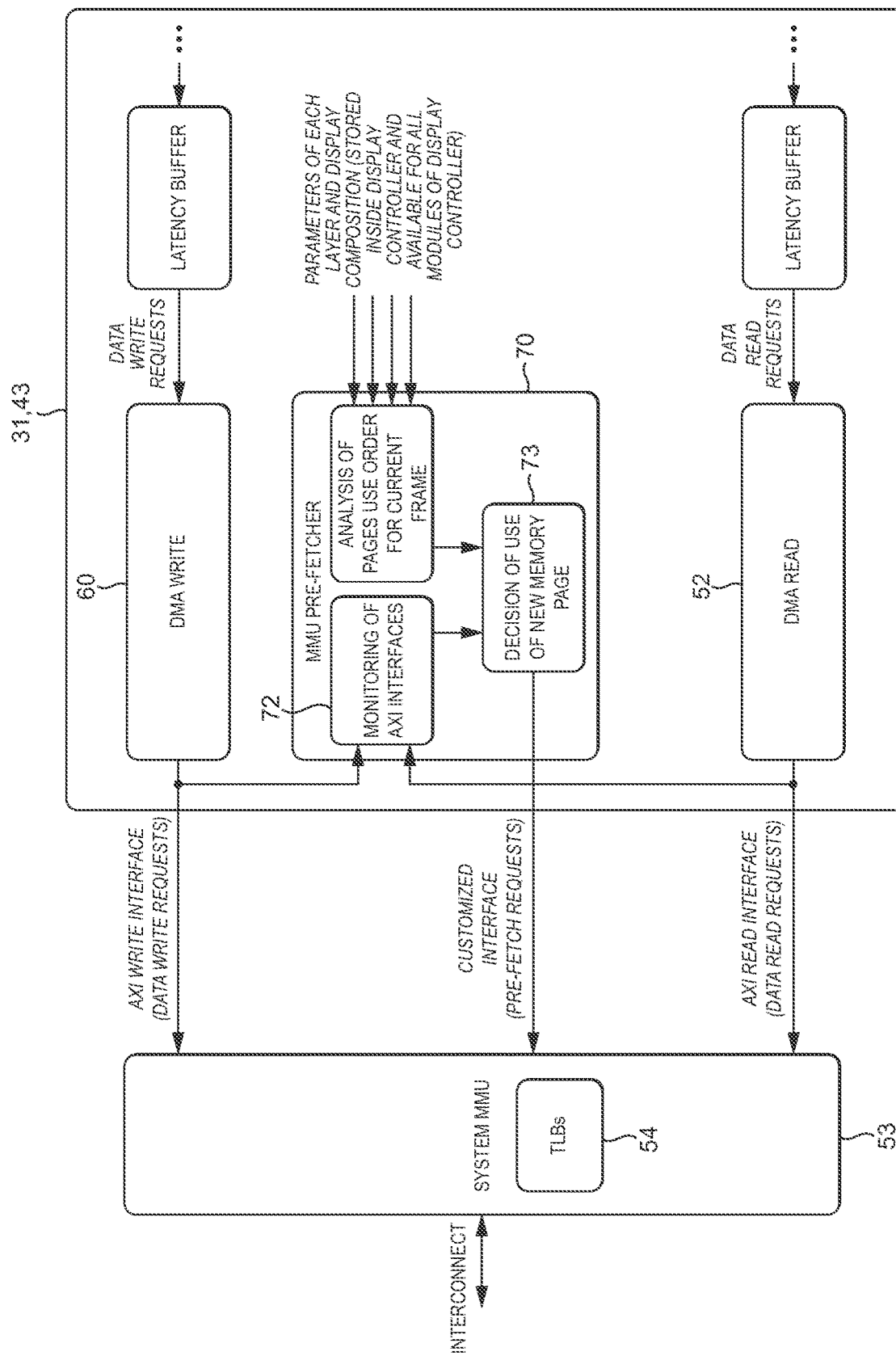

FIG. 7 shows another embodiment that is similar to the embodiment shown in FIG. 6, but in this case the MMU pre-fetcher 70 has a customised interface to the system MMU 53 so that it can send its memory page address translation data loading (pre-fetch) requests directly to the system MMU via that interface, rather than via the DMA read controller 52 as is done in the arrangement shown in FIG. 6.

Figure 8:
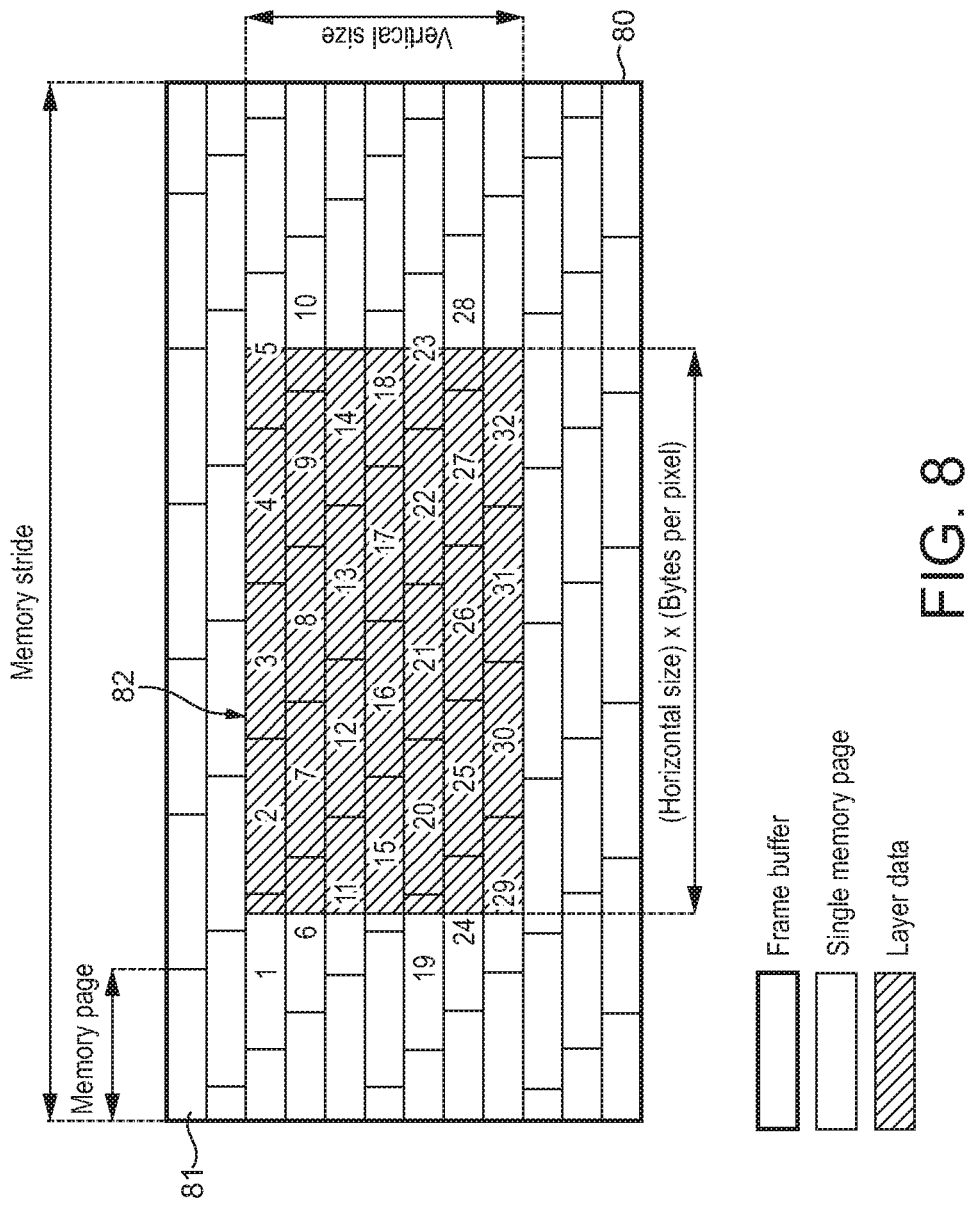
FIGS. 8 and 9 show examples of a sequence of memory page address translation data loading requests that may be sent in embodiments of the technology described herein.

FIG. 8 shows an exemplary set and sequence of advance memory page address translation data loading requests that may be sent by the memory read subsystem 31 based on control information relating to the data of an input surface that will be required for an input layer for processing to provide an output surface for display.

In this example, the input surface whose data is to be used for an input layer is stored in a frame buffer 80 which is comprised of, as shown in FIG. 8, plural memory pages 81. In this example it is assumed that the actual input layer 82 that will be processed by the display controller uses data from only a part of the overall input surface that is stored in the frame buffer 80.

The memory read subsystem 31 accordingly uses control information such as the horizontal and vertical size of the input layer that is required to identify those memory pages of the input surface frame buffer 80 that actually contain data that will be used by the display controller to generate the output surface in question (that will be used for the input layer in question), and then issues advance memory page address translation data loading requests for those memory pages only.

(As can be seen from FIG. 8, address translation data for any memory pages 81 containing data of the input surface in the frame buffer 80 that are not in fact required for the input layer 82 is not loaded into the address translation data cache (the TLB) in advance. This reduces memory bandwidth and power consumption in the memory system as compared, for example, to arrangements that simply load all the address translation data for all the memory pages storing the input surface (forming the frame buffer 80 for the input surface) into the address translation data cache (TLB).)

FIG. 8 also shows that the memory page address translation data loading requests are issued in order, starting with the memory page storing the top-left data for the input layer 82. In this case, it is assumed that there is no rotation or flipping of the input layer, such that the data for the input layer will be processed in raster order. That being the case, as shown in FIG. 8, the memory read subsystem 31 will issue its advance memory page address translation data loading requests for the data for the input layer 82 in raster order.

Figure 9:
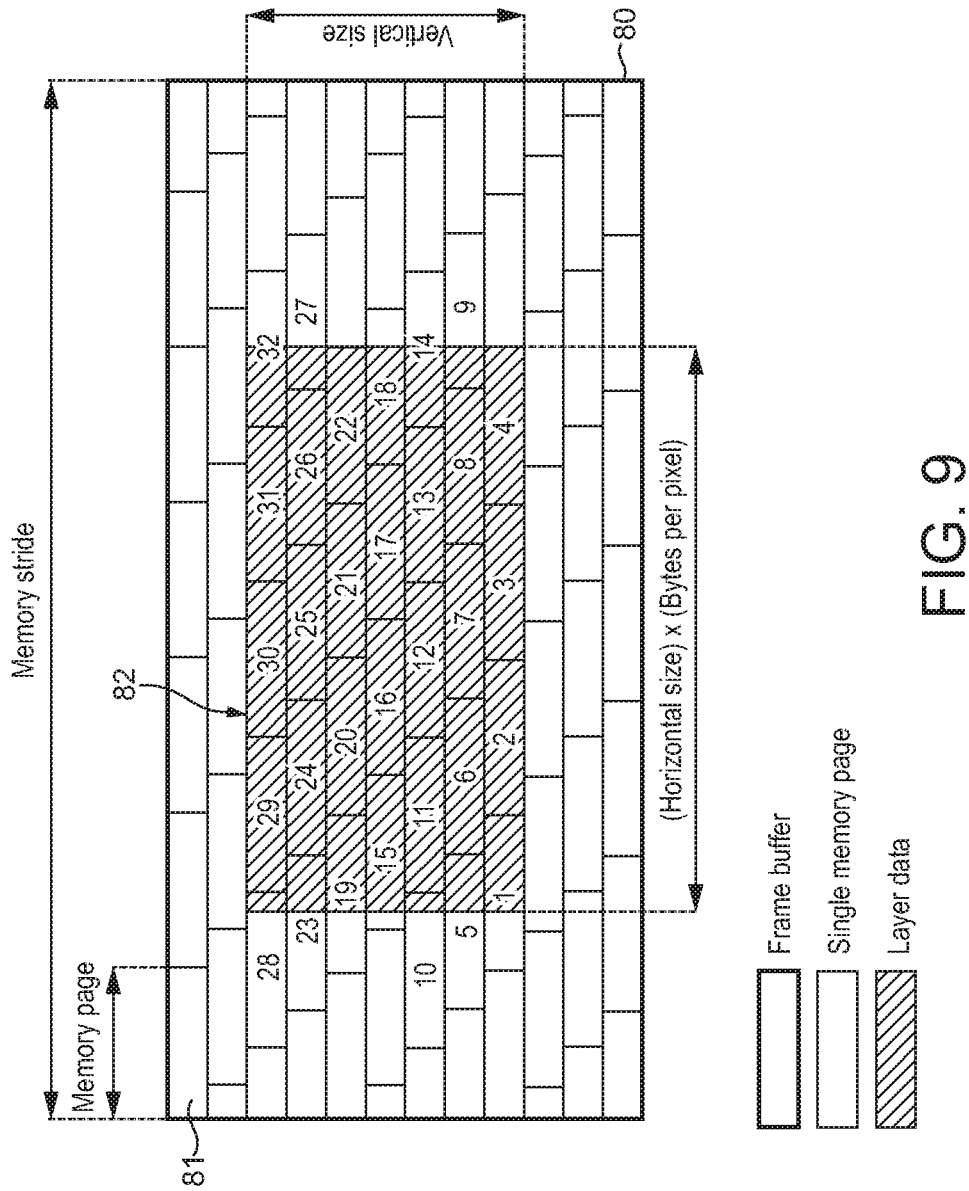

FIG. 9 shows a corresponding example to FIG. 8 again in which only part of an input surface stored in a frame buffer 80 is required to form an input layer 82 that will be processed by the display controller when generating an output surface.

However, in this example, it is assumed that the input layer 82 is to be subjected to vertical flipping. Thus in this case the processing of the input layer will start at the bottom-left of the input layer 82 (and then proceed in raster fashion to the top-right of the input layer 82).

The memory read subsystem 31 can identify that the input layer 82 is to be vertically flipped from the control information relating to the processing that that input layer is to be subjected to, and accordingly, as shown in FIG. 9, issues its advance memory page address translation data loading requests in the appropriate order to match the order that the data of the input surface for the input layer 82 will be required in (i.e. such that the memory page address translation data loading requests start with a request to load the address translation data for the memory page containing the data for the bottom-left corner of the input layer 82, and then proceed in raster order along each row of the input layer 82 until the address translation data for the top row of the input layer 82 has been loaded).

In the examples shown in FIGS. 8 and 9, the memory read subsystem 31 not only determines which memory pages to load address translation data into the cache in advance for based on the control information relating to the data of the input surface that is required for the input layer in question, but also, as shown in FIGS. 8 and 9, controls the order in which the memory page address translation data loading requests are sent (and thus the order in which the memory address translation data is loaded into the cache (TLB)) based on control information relating to the order in which the data in the memory pages (for the input layer) will be required.

Where the memory read subsystem 31 can control and select the order in which the memory page address translation data is loaded in this way, then that can be used to make the advance loading into the cache of the memory page address translation data more efficient. In particular, where, as in the arrangements illustrated in FIGS. 6 and 7, the memory read subsystem 31 is able to monitor the memory transactions and in particular to keep track of the use of data in the memory pages, then this can be used to allow the system to only store concurrently in the cache address translation data (page table entries) for a more limited number of memory pages for a given input layer (and thus overall).

Correspondingly, these arrangements can allow the display controller still to load memory page address translation data into the cache in advance, even when there is only capacity for address translation data for a limited number of memory pages to be cached.

Figure 10:
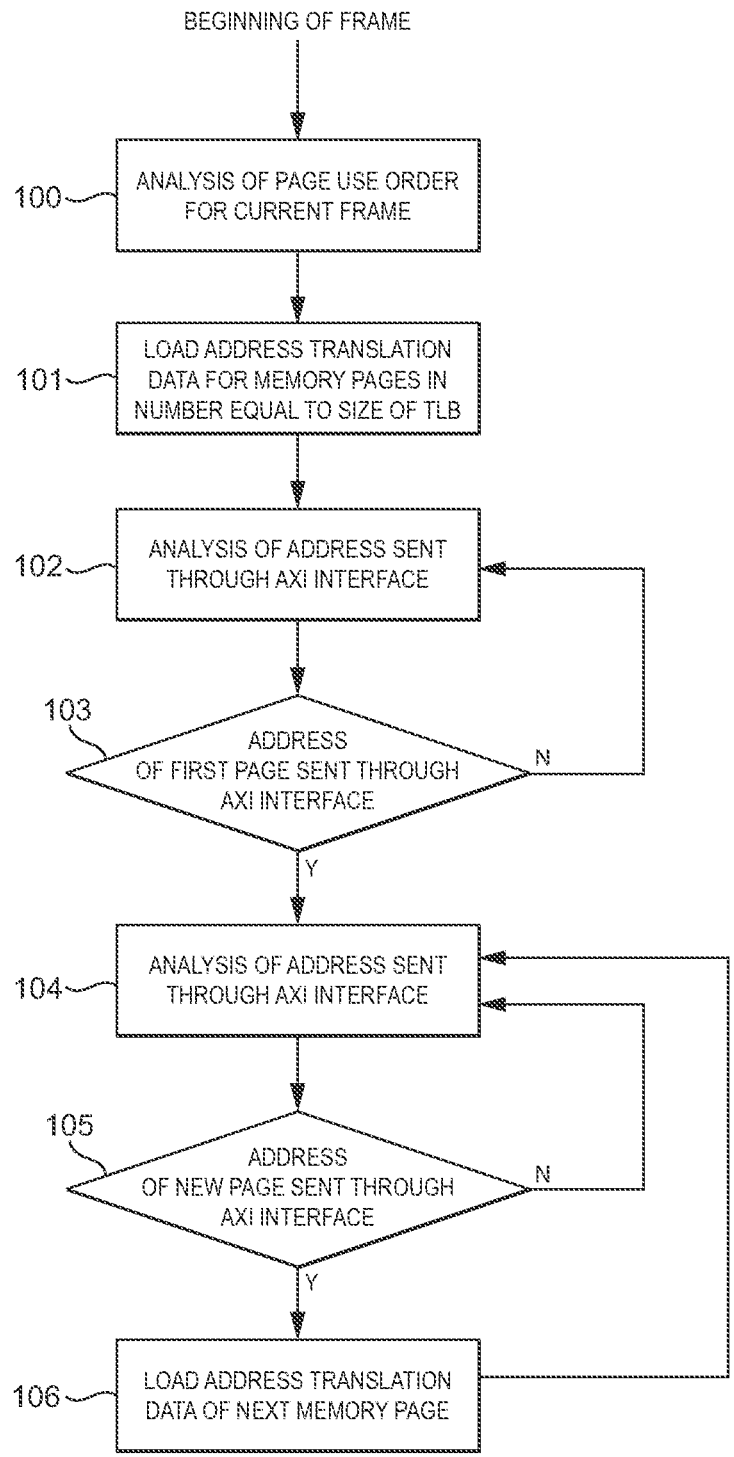
FIGS. 10 and 11 show an example of memory page address translation data loading requests that may be sent in embodiments of the technology described herein.
Figure 11:
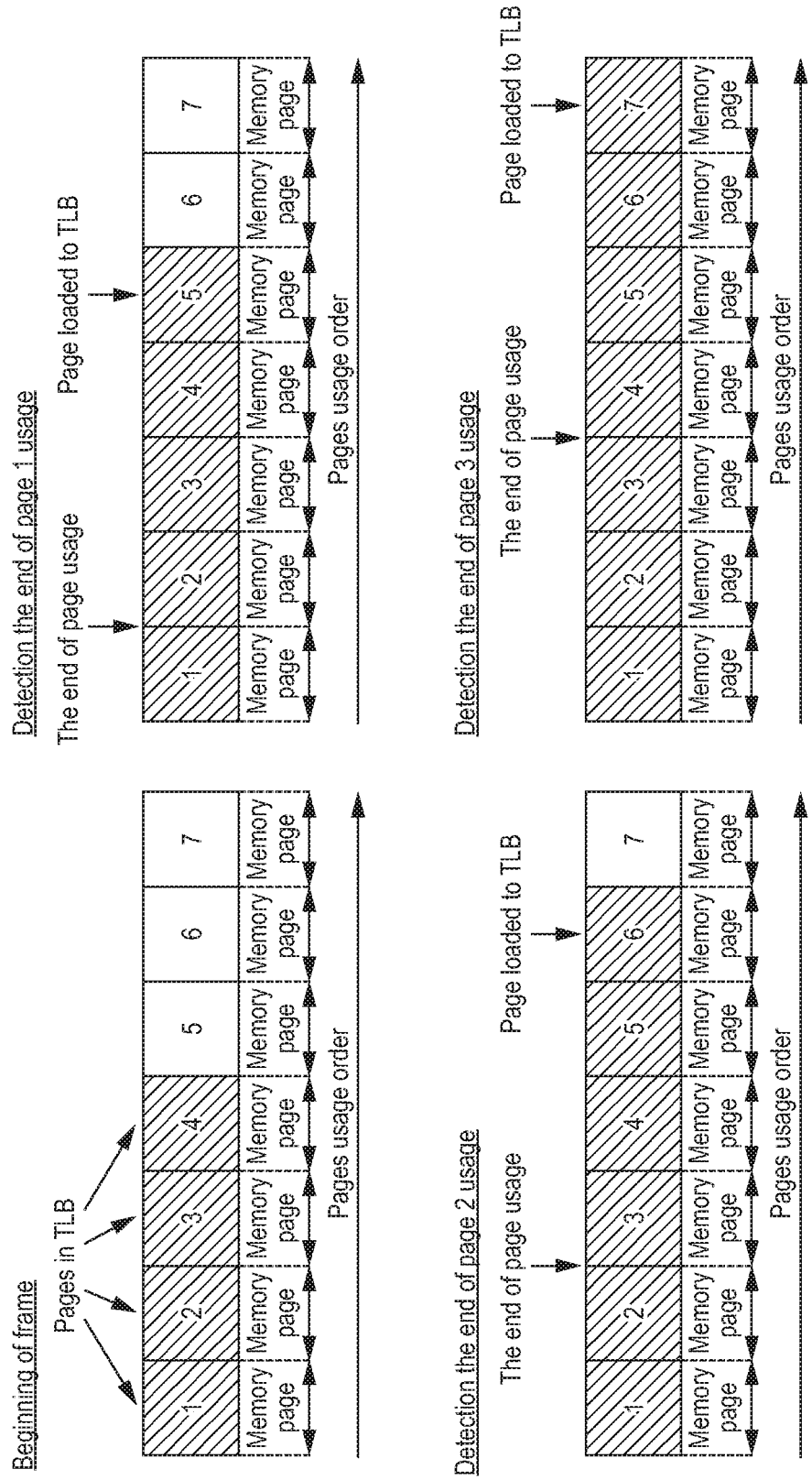

FIGS. 10 and 11 show an example of this operation.

FIG. 10 is a flowchart showing the operation of the MMU pre-fetcher 70 in this embodiment. FIG. 10 shows the operation in respect of a given input layer that is to be processed by the display controller 30 to generate the desired output surface (frame). The operation shown in FIG. 10 will correspondingly be repeated (and duplicated) for each input layer that is to be processed. It is also assumed in this regard that the memory management unit cache (translation lookaside buffer) has capacity to store address translation data (a page table entry) for only a limited (and, e.g., predefined) number of memory pages for a given input layer at any one time.

As shown in FIG. 10, at the beginning of a new output frame, the MMU pre-fetcher 70 will analyse the relevant control information for the input layer in question (step 100) and request the loading into the cache in advance of address translation data (page table entries) for a number of memory pages corresponding to the size of the number of memory page address translation data entries that the cache (translation lookaside buffer) can store for a given input layer at any one time (step 101). (The memory pages whose address translation data is loaded in advance will be the first pages in the page use order that are required for the input layer in question.)

The MMU pre-fetcher 70 then monitors the address transactions being sent to the system MMU to determine when data for the first memory page to be used has been requested (i.e. that the data of the memory pages is beginning to be accessed and used by the display controller 30) (steps 102 and 103).

Once it is determined that the data in the memory pages is being used, the MMU pre-fetcher 70 continues to track the use of the data in the memory pages (steps 104 and 105) by monitoring the addresses of the pages that are being accessed. When at step 105 the MMU pre-fetcher 70 identifies that a new page has begun to be accessed, it assumes that the data in the previous page is no longer required, and so the address translation data for the next memory page in the memory page use order (sequence) can be (and is) loaded into the cache (TLB) (step 106). The address translation data (page table entry) for the new memory page replaces the address translation data (page table entry) in the cache (TLB) for one of the previous memory pages. The present embodiment uses a least recently used (LRU) allocation policy for this, such that the address translation data for a new memory page will replace the address translation data of an old memory page that has been finished with. Other arrangements would, of course, be possible.

These steps (steps 104, 105 and 106) are then repeated until the entire input layer data has been read in and processed. In this way, the memory read subsystem 31 progressively loads into the cache (TLB) address translation data for new memory pages (and evicts from the cache address translation data for memory pages that have been finished with) in the order that the data of the input surface will be required for processing as an input layer by the display controller 31. Furthermore, because the use of the memory pages is monitored and address translation data for new memory pages is only loaded into the cache when old memory pages are, in effect, discarded, that means that the number of memory pages for which address translation data needs to be stored concurrently in the cache (TLB) for the input layer can be significantly reduced.

As this arrangement is repeated for each input layer that is being used, these arrangements can correspondingly significantly reduce the number of memory page address translation data entries that need to be stored concurrently in the cache (TLB) for the entire set of input layers that are being processed.

FIG. 11 illustrates this operation for an input layer where it is assumed that the memory management unit can cache address translation data (page table entries) for four memory pages concurrently (i.e. that address translation data for only four memory pages can be stored in the cache at the same time for a given input layer).

In this case, as shown in FIG. 11, address translation data for four memory pages is loaded into the cache at the beginning of the frame, and then the address translation data (page table entry) for each subsequent page is loaded into the cache singly, as the end of the usage of a previous memory page is detected.

This allows the address translation data cache in the system MMU required for a given input layer to be limited to only four entries.

Other arrangements would, of course, be possible.

A number of variations and modifications to the above described embodiments would be possible, if desired.

For example, although the present embodiments have been discussed in relation to the pre-fetching of address translation data for memory pages, the technology described herein could also or instead correspondingly operate to pre-fetch memory page protection data indicating access permissions for memory pages.

Similarly, although the above embodiments have been described with particular reference to the operation of display controllers, the techniques of the present embodiments and of the technology described herein could equally be used for other processors that load and use input surfaces in a corresponding manner, such as image signal processors.

It can be seen from the above that the technology described herein, in its embodiments, facilitates the more efficient use of memory pages storing input surfaces by a display controller. This is achieved in the embodiments of the technology described herein at least by the display controller requesting in advance the loading into a memory page access data cache of memory page access data, such as address translation data, for memory pages containing input surface data that it requires based on information relating to the data for the input surfaces that will be required by the display controller to generate the desired output surface (frame).

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A processing unit for a data processing system, the processing unit comprising:
   a memory read sub-system operable to read data of one or more input surfaces to be processed by the processing unit, wherein each input surface comprises an image for display;
   a processing stage operable to process the one or more read input surfaces each comprising an image for display to generate an output surface, based on control information provided to the processing unit; and
   an output stage operable to provide the output surface;
   wherein the memory read sub-system is operable to:
   take as an input the control information provided to the processing unit to control the processing by the processing stage of the one or more input surfaces each comprising an image for display generate the output surface;
   use the control information to determine information relating to the data for the one or more input surfaces each comprising an image for display that will be required by the processing stage to generate the output surface, to determine one or more memory pages storing the data relating to the one or more input surfaces each comprising an image for display that will be required by the processing stage to generate the output surface; and
   request in advance the loading of memory page access data for the determined memory pages storing data relating to the one or more input surfaces each comprising an image for display that will be required by the processing stage to generate the output surface into a memory page access data cache.

2. The processing unit of claim 1, wherein the information relating to the data for the one or more input surfaces that will be required by the processing stage that is used by the memory read subsystem comprises at least one of:
   information that allows a subset of memory pages of the set of memory pages that store the one or more input surfaces that store the input surface data that will be required by the processing stage to be identified; and
   information that is used to determine the order in which the input surface data will be required by the processing stage to generate the output surface.

3. The processing unit of claim 1, wherein the information relating to the data for each of the one or more input surfaces that will be required by the processing stage that is used by the memory read subsystem comprises at least one of: the vertical and horizontal size of the input layer that the input surface will be used for, the size of the memory pages occupied by the input surface; an indication of any flipping of the input surface; information indicative of any rotation of the input surface; information indicating the memory stride for the input surface; and information relating to decoding processing to be performed on the input surface.

4. The processing unit of claim 1, wherein, when the processing stage is to use plural input surfaces to generate the output surface, the information relating to the data for the input surfaces that will be required by the processing stage that is used by the memory read subsystem comprises at least one of:
   information relating to the way that the plural input surfaces are to be used to generate the output surface;
   information indicative of the horizontal and/or vertical offsets of the input surfaces, and/or of the order in which the input surfaces will be used, in the output surface; information relating to the way that the plural input surfaces will be composed by the processing stage; and information relating to the location of each input surface in a composited output surface that will be generated by the processing stage.

5. The processing unit of claim 1, wherein:
   the memory read subsystem is operable to perform at least one of:
   keep track of memory pages as they are being used, and to issue memory page access data loading requests based, at least in part, on the tracking of the use of the memory pages; and
   use information indicating the order that the memory pages containing the input surface data will be required in, together with tracking of the use of memory pages, to control and select both an order of issuing of memory page access data loading requests, and a timing of those requests; wherein the memory read subsystem is configured to only issue a request to load memory page access data for a new memory page when the memory read subsystem determines that the use of a previous memory page has been completed.

6. The processing unit of claim 1, wherein:
   the memory read subsystem is configured to be able to store in the memory page access data cache access data for only a particular number of memory pages for an input surface at the same time, and the number of memory pages for which access data can be concurrently stored in the cache is configurable in use.

7. The processing unit of claim 1, wherein:
   the processing unit is a display controller or an image signal processor.

8. The processing unit of claim 1, wherein:
   the memory page access data comprises memory address translation data and/or memory protection data for a memory page.

9. A data processing system comprising:
   a main memory;
   one or more processing units operable to generate input surfaces each comprising an image for display and to store the input surfaces in the main memory; and
   a processing unit;
   wherein the processing unit comprises:
   a memory read sub-system operable to read data of one or more input surfaces to be processed by the processing unit, wherein each input surface comprises an image for display;
   a processing stage operable to process the one or more read input surfaces each comprising an image for display to generate an output surface, based on control information provided to the processing unit; and
   an output stage operable to provide the output surface;
   wherein the memory read sub-system is operable to:
   take as an input the control information provided to the processing unit to control the processing by the processing stage of the one or more input surfaces each comprising an image for display to generate the output surface;
   use the control information to determine information relating to the data for the one or more input surfaces each comprising an image for display that will be required by the processing stage to generate the output surface, to determine one or more memory pages storing the data relating to the one or more input surfaces each comprising an image for display that will be required by the processing stage to generate the output surface; and request in advance the loading of memory page access data for the determined memory pages storing data relating to the one or more input surfaces each comprising an image for display that will be required by the processing stage to generate the output surface into a memory page access data cache.

10. A method of operating a processing unit for a data processing system, the processing unit comprising:

a memory read sub-system operable to read data of one or more input surfaces to be processed by the processing unit, wherein each input surface comprises an image for display;

a processing stage operable to process the one or more read input surfaces each comprising an image for display to generate an output surface, based on control information provided to the processing unit; and an output stage operable to provide the output surface;

the method comprising, when the processing unit is to generate the output surface from the one or more input surfaces each comprising an image for display based on the control information provided to the processing unit:

the memory read sub-system:

taking as an input the control information provided to the processing unit to control the processing by the processing stage of the one or more input surfaces each comprising an image for display to generate the output surface;

using the control information to determine information relating to the data for the one or more input surfaces each comprising an image for display that will be required by the processing stage to generate the output surface, to determine one or more memory pages storing the data relating to the one or more input surfaces each comprising an image for display that will be required by the processing stage to generate the output surface; and requesting the loading of memory page access data for the determined memory pages storing data relating to the one or more input surfaces each comprising an image for display that will be required by the processing stage to generate the output surface into a memory page access data cache in advance of a request for the data of the one or more input surfaces each comprising an image for display that is stored in the memory pages in question.

11. The method of claim 10, wherein the information relating to the data for the one or more input surfaces that will be required by the processing stage that is used by the memory read subsystem comprises at least one of:

information that allows a subset of memory pages of the set of memory pages that store the one or more input surfaces that store the input surface data that will be required by the processing stage to be identified; and information that is used to determine the order in which the input surface data will be required by the processing stage to generate the output surface.

12. The method of claim 10, wherein the information relating to the data for each of the one or more input surfaces that will be required by the processing stage that is used by the memory read subsystem comprises at least one of: the vertical and horizontal size of the input layer that the input surface will be used for, the size of the memory pages occupied by the input surface; an indication of any flipping of the input surface; information indicative of any rotation of the input surface; information indicating the memory stride for the input surface; and information relating to decoding processing to be performed on the input surface.

13. The method of claim 10, comprising:

the processing stage using plural input surfaces to generate the output surface;

and wherein:

the information relating to the data for the one or more input surfaces that will be required by the processing stage that is used by the memory read subsystem comprises at least one of:

information relating to the way that plural input surfaces are to be used to generate the output surface; information indicative of the horizontal and/or vertical offsets of the input surfaces, and/or of the order in which plural input surfaces will be used, in the output surface; information relating to the way that plural input surfaces will be composed by the processing stage; and information relating to the location of each input surface in a composited output surface that will be generated by the processing stage.

14. The method of claim 10, comprising:

the memory read subsystem performing at least one of:

keeping track of memory pages as they are being used, and issuing memory page access data loading requests based, at least in part, on the tracking of the use of the memory pages; and using information indicating the order that the memory pages containing the input surface data will be required in, together with tracking of the use of memory pages, to control and select both an order of issuing of memory page access data loading requests, and a timing of those requests; wherein the memory read subsystem only issues a request to load memory page access data for a new memory page when the memory read subsystem determines that the use of a previous memory page has been completed.

15. The method of claim 10, wherein:

the memory read subsystem is configured to be able to store in the memory page access data cache access data for only a particular number of memory pages for an input surface at the same time, and the number of memory pages for which access data can be concurrently stored in the cache is configurable in use.

16. The method of claim 10, wherein:

the processing unit is a display controller or an image signal processor.

17. The method of claim 10, wherein:

the memory page access data comprises memory address translation data and/or memory protection data for a memory page.

18. A non-transitory computer-readable storage medium storing computer software code which when executing on a processor performs a method of operating a processing unit for a data processing system, the processing unit comprising:

a memory read sub-system operable to read data of one or more input surfaces to be processed by the processing unit, wherein each input surface comprises an image for display;

a processing stage operable to process the one or more read input surfaces each comprising an image for display to generate an output surface, based on control information provided to the processing unit; and an output stage operable to provide the output surface;

the method comprising, when the processing unit is to generate the output surface from the one or more input surfaces each comprising an image for display based on the control information provided to the processing unit:

the memory read sub-system:

taking as an input the control information provided to the processing unit to control the processing by the processing stage of the one or more input surfaces each comprising an image for display to generate the output surface;

using the control information to determine information relating to the data for the one or more input surfaces each comprising an image for display that will be required by the processing stage to generate the output surface, to determine one or more memory pages storing the data relating to the one or more input surfaces each comprising an image for display that will be required by the processing stage to generate the output surface; and requesting the loading of memory page access data for the determined memory pages storing data relating to the one or more input surfaces each comprising an image for display that will be required by the processing stage to generate the output surface into a memory page access data cache in advance of a request for the data of the one or more input surfaces each comprising an image for display that is stored in the memory pages in question.

* * * * *